(12) United States Patent
Silverstein

(10) Patent No.: US 8,947,424 B2
(45) Date of Patent: Feb. 3, 2015

(54) SPECTRAL STEREOSCOPIC PROJECTION SYSTEM

(75) Inventor: Barry David Silverstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 544 days.

(21) Appl. No.: 13/351,449

(22) Filed: Jan. 17, 2012

(65) Prior Publication Data

US 2013/0181973 A1 Jul. 18, 2013

(51) Int. Cl.
G06T 15/00 (2011.01)
H04N 13/00 (2006.01)
G02B 27/22 (2006.01)

(52) U.S. Cl.
CPC ........ H04N 13/0018 (2013.01); G02B 27/2207 (2013.01)
USPC ........................................................ 345/419

(58) Field of Classification Search
CPC ........... G02B 27/1026; G02B 27/1086; G02B 27/145; G03B 27/725; H04N 13/0402; H04N 19/00769; H04N 9/3129
See application file for complete search history.

(56) References Cited

U.S. PATENT DOCUMENTS

| | | | |
|---|---|---|---|
| 4,734,756 A | 3/1988 | Butterfield | |
| 5,165,077 A | 11/1992 | Rokugawa et al. | |
| 5,774,278 A | 6/1998 | Kaplan | |
| 6,283,597 B1 | 9/2001 | Jorke | |
| 6,793,341 B2 | 9/2004 | Svardal et al. | |
| 6,967,778 B1 | 11/2005 | Wheatley et al. | |
| 7,147,332 B2 | 12/2006 | Conner | |

(Continued)

FOREIGN PATENT DOCUMENTS

| | | |
|---|---|---|
| DE | 198 08 264 | 11/1998 |
| EP | 2 227 027 | 9/2010 |

OTHER PUBLICATIONS

Padilla, "New metamaterial proves to be a 'perfect' absorber of light," Science Daily, (May 29, 2008).

(Continued)

*Primary Examiner* — Huy T Nguyen
(74) *Attorney, Agent, or Firm* — Kevin E. Spaulding

(57) ABSTRACT

A stereoscopic digital projection system that projects stereoscopic images including first-eye images and second-eye images onto a display surface. The first-eye images are formed using red, green and blue first-eye light emitters having corresponding spectral bands with red, green and blue first-eye central wavelengths, $\lambda_{R1}$, $\lambda_{G1}$ and $\lambda_{B1}$. The second-eye images are formed using red, green and blue second-eye light emitters having corresponding spectral bands with red, green and blue second-eye central wavelengths, $\lambda_{R2}$, $\lambda_{G2}$ and $\lambda_{B2}$. The central wavelengths are arranged such that $\lambda_{B1} < \lambda_{B2} < \lambda_{G2} < \lambda_{G1} < \lambda_{R1} < \lambda_{R2}$. An image forming system including at least one spatial light modulator is used to form first-eye and second-eye modulated images by modulating light from the first-eye and second light emitters. Projection optics are used to deliver the first-eye and second-eye modulated images to a display surface.

21 Claims, 31 Drawing Sheets

(56) References Cited

U.S. PATENT DOCUMENTS

| | | |
|---|---|---|
| 7,784,938 B2 | 8/2010 | Richards et al. |
| 7,832,869 B2 | 11/2010 | Maximus et al. |
| 7,891,816 B2 | 2/2011 | Silverstein et al. |
| 7,959,295 B2 | 6/2011 | Richards et al. |
| 8,016,422 B2 | 9/2011 | Silverstein et al. |
| 2001/0048493 A1 | 12/2001 | Swanson et al. |
| 2004/0076198 A1 | 4/2004 | Spoonhower et al. |
| 2005/0018332 A1 | 1/2005 | Vizard et al. |
| 2007/0236809 A1 | 10/2007 | Lippey et al. |
| 2007/0247709 A1 | 10/2007 | Karakawa |
| 2008/0151193 A1 | 6/2008 | Reder |
| 2009/0110013 A1 | 4/2009 | Gollier et al. |
| 2009/0153752 A1 | 6/2009 | Silverstein |
| 2009/0190095 A1 | 7/2009 | Ellinger |
| 2010/0060857 A1 | 3/2010 | Richards et al. |
| 2010/0066813 A1 | 3/2010 | Jorke |
| 2010/0073769 A1 | 3/2010 | Richards et al. |
| 2010/0225836 A1 | 9/2010 | Ockenfuss |
| 2011/0063726 A1 | 3/2011 | Ramstad |
| 2011/0080108 A1 | 4/2011 | Chiang et al. |
| 2011/0205494 A1 | 8/2011 | Richards et al. |
| 2011/0285962 A1 | 11/2011 | Ellinger et al. |
| 2012/0133649 A1* | 5/2012 | Reder .................. 345/419 |
| 2013/0141784 A1* | 6/2013 | White .................. 359/465 |

OTHER PUBLICATIONS

Aydin et al., "Broadband polarization-independent resonant light absorption using ultrathin plasmonic super absorbers" Nature Communications, pp. 1-7, Nov. 1, 2011.

Zhou et al., "Photonic crystal enhanced light-trapping in thin film solar cells," Journal of Applied Physics, vol. 103, paper 093102 (2008).

"No paint needed! Virus patterns produce dazzling colour," New Scientist, p. 18, Oct. 29, 2011.

Overton, "760 kHz OCT scanning possible with MEMS-tunable VCSEL," Laser Focus World, p. 15, Jul. 2011.

Feng et al., "Wavelength bistability and switching in two-section quantum-dot diode lasers," IEEE Journal of Quantum Electronics, vol. 46, pp. 951-958 (2010).

Hong, et al., "Visible-Color-Tunable Light-Emitting Diodes," Advanced Materials, vol. 23, pp. 3284-3288 (2011).

* cited by examiner

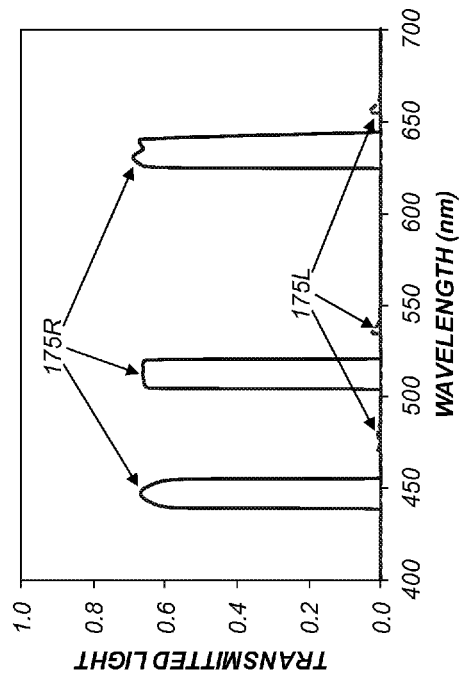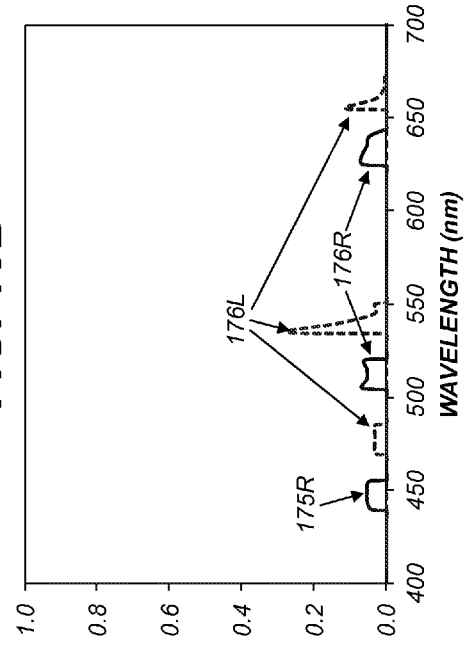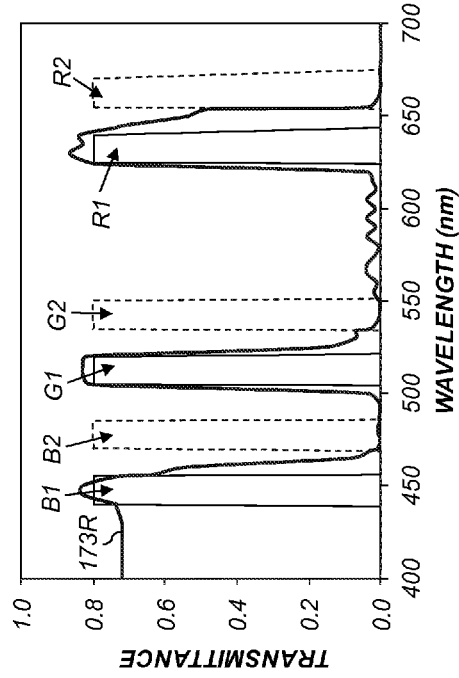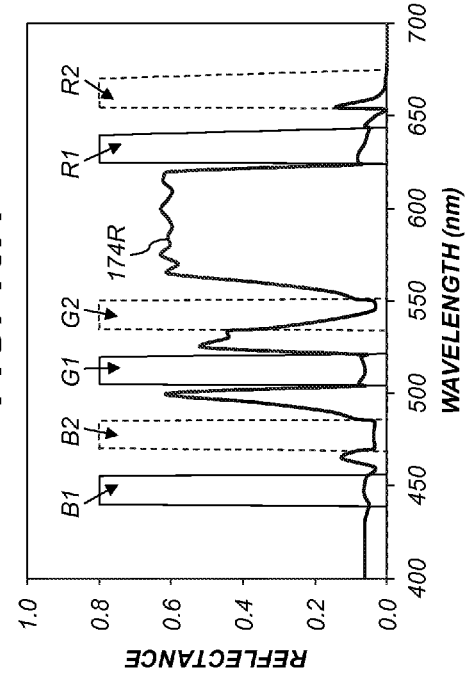

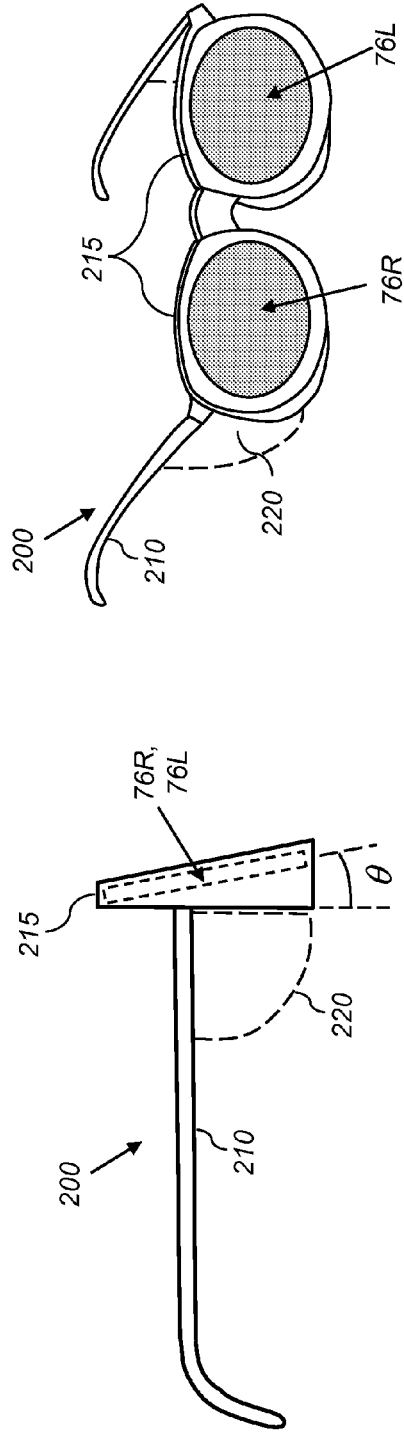
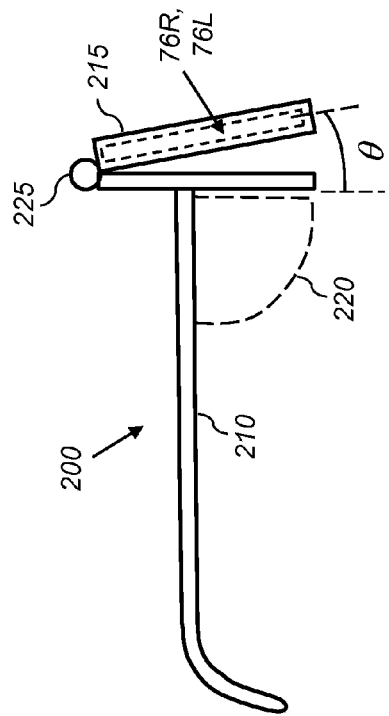
FIG. 21A
FIG. 21B
FIG. 21C

SPECTRAL STEREOSCOPIC PROJECTION SYSTEM

CROSS-REFERENCE TO RELATED APPLICATIONS

Reference is made to commonly assigned, U.S. patent application Ser. No. 13/251,456, now U.S. Pat. No. 8,746,888, entitled: "Stereoscopic projector using spectrally-adjacent color bands", by Silverstein et al.; to commonly assigned, U.S. patent application Ser. No. 13/251,472, now U.S. Pat. No. 8,651,663, entitled: "Stereoscopic projector using scrolling color bands", by Silverstein et al.; to commonly assigned, co-pending U.S. patent application Ser. No. 13/351,432, entitled: "Stereoscopic glasses using dichroic and absorptive layers", by Silverstein et al.; to commonly assigned, U.S. patent application Ser. No. 13/351,495, abandoned, entitled: "Filter glasses for spectral stereoscopic projection system", by Silverstein et al.; to commonly assigned, co-pending U.S. patent application Ser. No. 13/351,470, entitled: "Stereoscopic projection system using tunable light emitters", by Silverstein et al.; and to commonly assigned, co-pending U.S. patent application Ser. No. 13/351,518, entitled: "Stereoscopic glasses using tilted filters", by Silverstein et al., each of which is incorporated herein by reference.

FIELD OF THE INVENTION

This invention relates to a stereoscopic digital projection system that uses spectrally-adjacent light sources to form left-eye and right-eye images, and more particularly to a stereoscopic digital projection system that uses non-interleaved light sources.

BACKGROUND OF THE INVENTION

In order to be considered as suitable replacements for conventional film projectors, digital projection systems must meet demanding requirements for image quality. This is particularly true for multicolor cinematic projection systems. Competitive digital projection alternatives to conventional cinematic-quality projectors must meet high standards of performance, providing high resolution, wide color gamut, high brightness, and frame-sequential contrast ratios exceeding 2,000:1.

Stereoscopic projection is a growing area of special interest for the motion picture industry. Three-dimensional (3-D) images or perceived stereoscopic content offer consumers an enhanced visual experience, particularly in large venues. Conventional stereoscopic systems have been implemented using film, in which two sets of films and projectors simultaneously project orthogonal polarizations, one for each eye, termed a "left-eye image" and a "right-eye image" in the context of the present disclosure. Audience members wear corresponding orthogonally polarized glasses that block one polarized light image for each eye while transmitting the orthogonal polarized light image.

In the ongoing transition of the motion picture industry to digital imaging, some vendors, such as IMAX, have continued to utilize a two-projection system to provide a high quality stereo image. More recently, however, conventional digital projectors have been modified to enable 3D projection.

Conventional methods for forming stereoscopic images from these digital projectors have used one of two primary techniques for distinguishing left- and right-eye images. One technique, utilized by Dolby Laboratories, for example, uses spectral or color space separation. The method used is similar to that described in U.S. Pat. No. 7,832,869, entitled "Method and device for performing stereoscopic image display based on color selective filters" to Maximus et al., wherein color space separation is used to distinguish between the left-eye and right-eye image content. The image for each eye is projected using primary Red, Green, and Blue component colors, but the precise Red, Green, and Blue wavelengths that are used differ between left- and right-eye images. To achieve this separation, filters are utilized in the white light illumination system to momentarily block out portions of each of the primary colors for a portion of the frame time. For example, for the left eye, the lower wavelength spectrum of Red, Blue, and Green (RGB) would be blocked for a period of time. This would be followed by blocking the higher wavelength spectrum of Red, Blue, and Green (RGB) for the other eye. The appropriate color adjusted stereo content that is associated with each eye is presented to each spatial light modulator for the eye. The viewer wears viewing glasses with a corresponding filter set that similarly transmits only one of the two 3-color (RGB) spectral sets to each eye.

A second approach utilizes polarized light. One method disclosed in U.S. Pat. No. 6,793,341 to Svardal et al., utilizes each of two orthogonal polarization states delivered to two separate spatial light modulators. Polarized light from both modulators is then projected simultaneously. The viewer wears polarized glasses with polarization transmission axes for left and right eyes orthogonally oriented with respect to each other.

There are advantages and drawbacks with each approach. Spectral separation solutions, for example, are advantaged by being more readily usable with less expensive display screens. With spectral separation, polarization properties of the modulator or associated optics do not significantly affect performance. However, the needed filter glasses have been expensive and image quality is reduced by factors such as angular shift, head motion, and tilt. Expensive filter glasses are also subject to scratch damage and theft. Promising developments in filter glass design, including the use of layered optical films produced by non-evaporative means by 3M Corp, can help to address the cost problem and make spectral separation techniques more cost-effective.

Another drawback of the spectral separation approach relates to difficulties in adjustment of the color space and significant light loss due to filtering, leading to either a higher required lamp output or reduced image brightness. Filter losses have been addressed in U.S. Patent Application Publication 2009/0153752 to Silverstein, entitled "Projector using independent multiple wavelength light sources" wherein independent spectrally-adjacent sources are combined by a beamsplitter to be efficiently directed to a spatial light modulator. One disadvantage of this approach is that these light sources are only utilized approximately half of the time, as the modulator can only provide one eye image in time. While the light sources will likely have a longer life, the initial cost of the display is increase by the cost requirement of two sets of independent sources.

With polarization for separating the left- and right-eye images, light can be used more efficiently. U.S. Pat. No. 7,891,816 to Silverstein et al., entitled "Stereo projection using polarized solid state light sources," and U.S. Pat. No. 8,016,422 to Silverstein et al., entitled "Etendue maintaining polarization switching system and related methods," describe projection system configurations that fully utilize the light source for both polarization states. However, polarization techniques are disadvantaged by the additional cost and sensitivity of polarization maintaining screens, which typically utilize a structured metallic coating. These coatings are high gain, which improves on axis viewing, but are poor for off axis viewing. Furthermore, the specular reflections with this method can be troubling for some viewers. This effect is further exacerbated when using coherent light, as it leads to higher levels of viewer perceived speckle. Projectors using polarized light are typically more costly due to the difficulty of maintaining high polarization control through high angle optics as well as being more sensitive to dirt and defects. Therefore any gains in efficiency can be somewhat offset by other problems.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image. Numerically, etendue is proportional to the product of two factors, namely the image area and the numerical aperture. In terms of the simplified optical system represented in FIG. 1 having light emitter 12, optics 18, and a spatial light modulator 20, the etendue of the light source is a product of the light source area A1 and its output angle θ1. Likewise, the etendue of the spatial light modulator 20 equal to the product of the modulator area A2 and its acceptance angle θ2. For increased brightness, it is desirable to provide as much light as possible from the area of light source 12. As a general principle, the optical design is advantaged when the etendue at the light emitter 12 is most closely matched to the etendue at the spatial light modulator 20.

Increasing the numerical aperture, for example, increases the etendue so that the optical system captures more light. Similarly, increasing the light source size, so that light originates over a larger area, increases etendue. In order to utilize an increased etendue on the illumination side, the etendue of the spatial light modulator 20 must be greater than or equal to that of the light source 12. Typically, however, the larger the spatial light modulator 20, the more costly it will be. This is especially true when using devices such as LCOS and DLP components, where the silicon substrate and defect potential increase with size. As a general rule, increased etendue results in a more complex and costly optical design.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

Solid-state lasers promise improvements in etendue, longevity, and overall spectral and brightness stability. Recently, devices such as VCSEL (Vertical Cavity Surface-Emitting Laser) laser arrays have been commercialized and show some promise, when combined in various ways, as potential light sources for digital cinema projection. However, brightness itself is not yet high enough; the combined light from as many as 9 individual arrays is needed in order to provide the necessary brightness for each color.

Laser arrays of particular interest for projection applications are various types of VCSEL arrays, including VECSEL (Vertical Extended Cavity Surface-Emitting Laser) and NEC-SEL (Novalux Extended Cavity Surface-Emitting Laser) devices from Novalux, Sunnyvale, Calif.

However, even with improvements in laser technology and in filter preparation and cost, there is considerable room for improvement in methods of stereoscopic imaging projection. Conventional solutions that use spectral separation of left- and right-eye images are typically light-starved, since at most only half of the light that is generated is available for each eye.

Thus, there is a need for a stereoscopic imaging solution that offers increased optical efficiencies with decreased operational and equipment costs.

SUMMARY OF THE INVENTION

The present invention represents a stereoscopic digital projection system that projects stereoscopic images including first-eye images and second-eye images onto a display surface, comprising:

narrow-band, solid-state, red, green and blue first-eye light emitters having corresponding red, green and blue first-eye spectral bands with respective red, green and blue first-eye central wavelengths, $\lambda_{R1}$, $\lambda_{G1}$ and $\lambda_{B1}$;

narrow-band, solid-state, red, green and blue second-eye light emitters having corresponding red, green and blue second-eye spectral bands with respective red, green and blue second-eye central wavelengths, $\lambda_{R2}$, $\lambda_{G2}$ and $\lambda_{B2}$, the first-eye spectral bands being substantially non-overlapping with the second-eye spectral bands, and the central wavelengths being arranged such that $\lambda_{B1} < \lambda_{B2} < \lambda_{G2} < \lambda_{G1} < \lambda_{R1} < \lambda_{R2}$;

an image forming system including at least one spatial light modulator for forming a first-eye modulated image by modulating light from the red, green and blue first-eye light emitters responsive to image data for a first-eye image and for forming a second-eye modulated image by modulating light from the red, green and blue second-eye light emitters responsive to image data for a second-eye image; and projection optics for delivering the first-eye modulated image and the second-eye modulated image to a display surface.

This invention has the advantage that the non-interleaved ordering of the central wavelengths enables the use of filter glasses having filters with simpler spectral transmittance characteristics relative to those required for prior art systems that use interleaved spectral bands. The simpler spectral transmittance characteristics reduce the cost and complexity of the manufacturing process used to make the filters.

BRIEF DESCRIPTION OF THE DRAWINGS

FIG. 19A is a graph showing spectral transmittance characteristics for an example hybrid right-eye filter that combines a dichroic filter stack and an absorptive filter layer;

FIG. 19B is a graph showing transmitted light provided by the hybrid right-eye filter of FIG. 19A;

FIG. 19C is a graph showing spectral reflectance characteristics for the hybrid right-eye filter of FIG. 19A;

FIG. 19D is a graph showing reflected light provided by the hybrid right-eye filter of FIG. 19A;

FIG. 21A is a side view showing filter glasses with tilted filter elements;

FIG. 21B is a perspective view showing filter glasses with tilted filter elements;

FIG. 21C is a side view showing filter glasses with a hinge for adjusting a tilt angle for tilted filter elements;

DETAILED DESCRIPTION OF THE INVENTION

Figure 1:
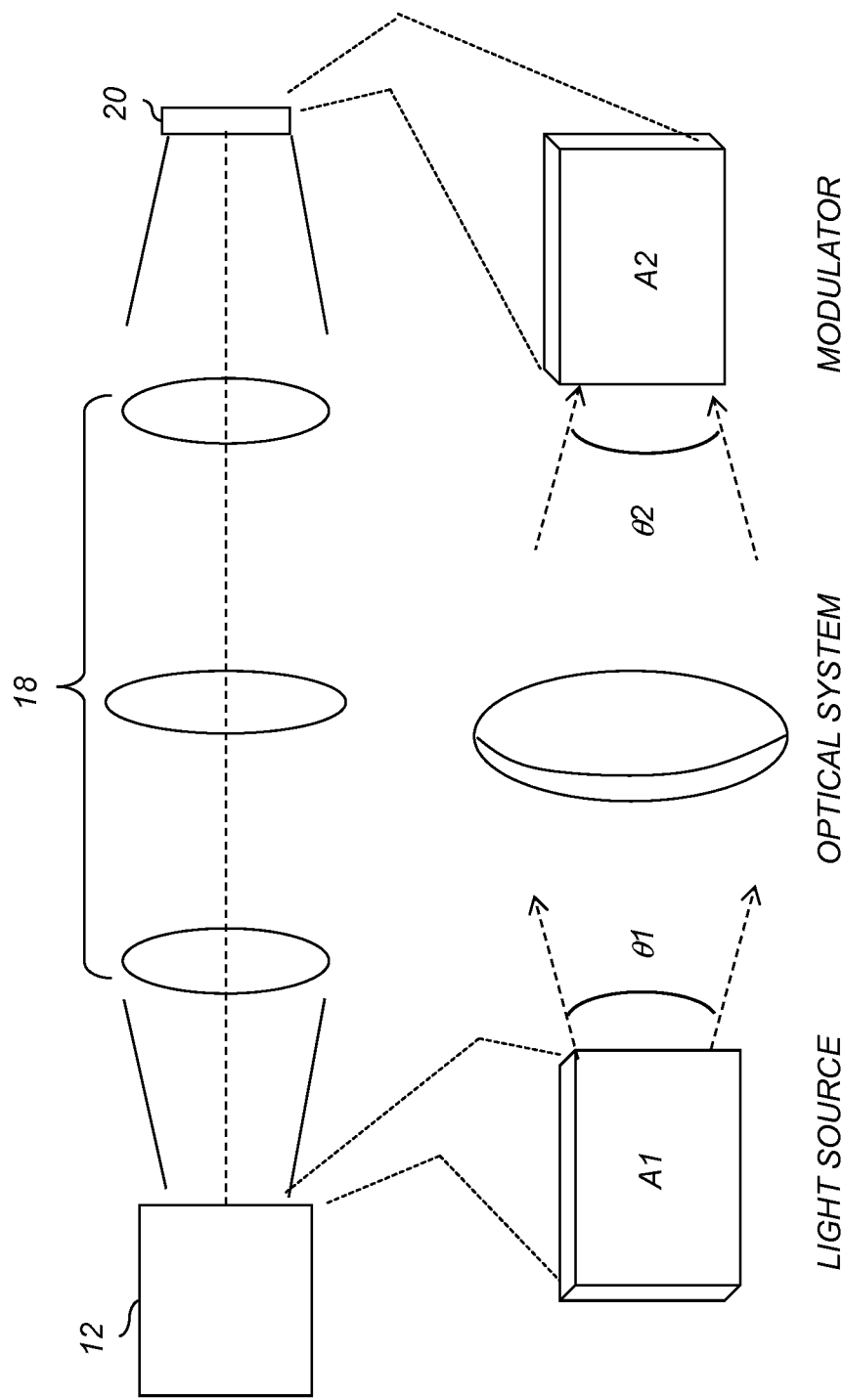
FIG. 1 is a representative diagram showing factors in etendue calculation for an optical system.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation. In addition, various components such as those used to position and mount optical components, for example, are not shown in order to better show and describe components that relate more closely to embodiments of the present invention.

Where they are used, the terms "first", "second", and so on, do not necessarily denote any ordinal or priority relation, but may be simply used to more clearly distinguish one element from another.

The terms "color" and "wavelength band" and "spectral band" are generally synonymous as used in the context of the present disclosure. For example, a laser or other solid-state light source is referred to by its general color spectrum, such as red, rather than by its peak output wavelength (such as 635 nm) or its spectral band (such as 630-640 nm). In the context of the present disclosure, different spectral bands are considered to be essentially non-overlapping.

The terms "viewer" and "observer" are used equivalently to refer to a person viewing the stereoscopic display of the present invention. The term "left-eye image" refers to the image formed for viewing by the left eye of the observer. Correspondingly, the term "right-eye image" refers to the image formed for viewing by the right eye of the observer.

Embodiments of the present invention address the need for improved brightness in a stereoscopic viewing system using independent adjacent spectral sources.

In the context of the present invention, the terms "transmission band" and "pass band" are considered to be equivalent.

In the context of the present invention, the term "spectrally-adjacent" relates to nearby spectral bands within the general color spectrum that are used for the component colors that form a color image, typically red, green, blue, and possibly including a fourth color and other additional colors. The corresponding spectrally-adjacent colors for each component color lie in the same color spectrum, but have different wavelength ranges for left- and right-eye images such that the spectral bands are substantially non-overlapping with respect to wavelength.

Figure 2:
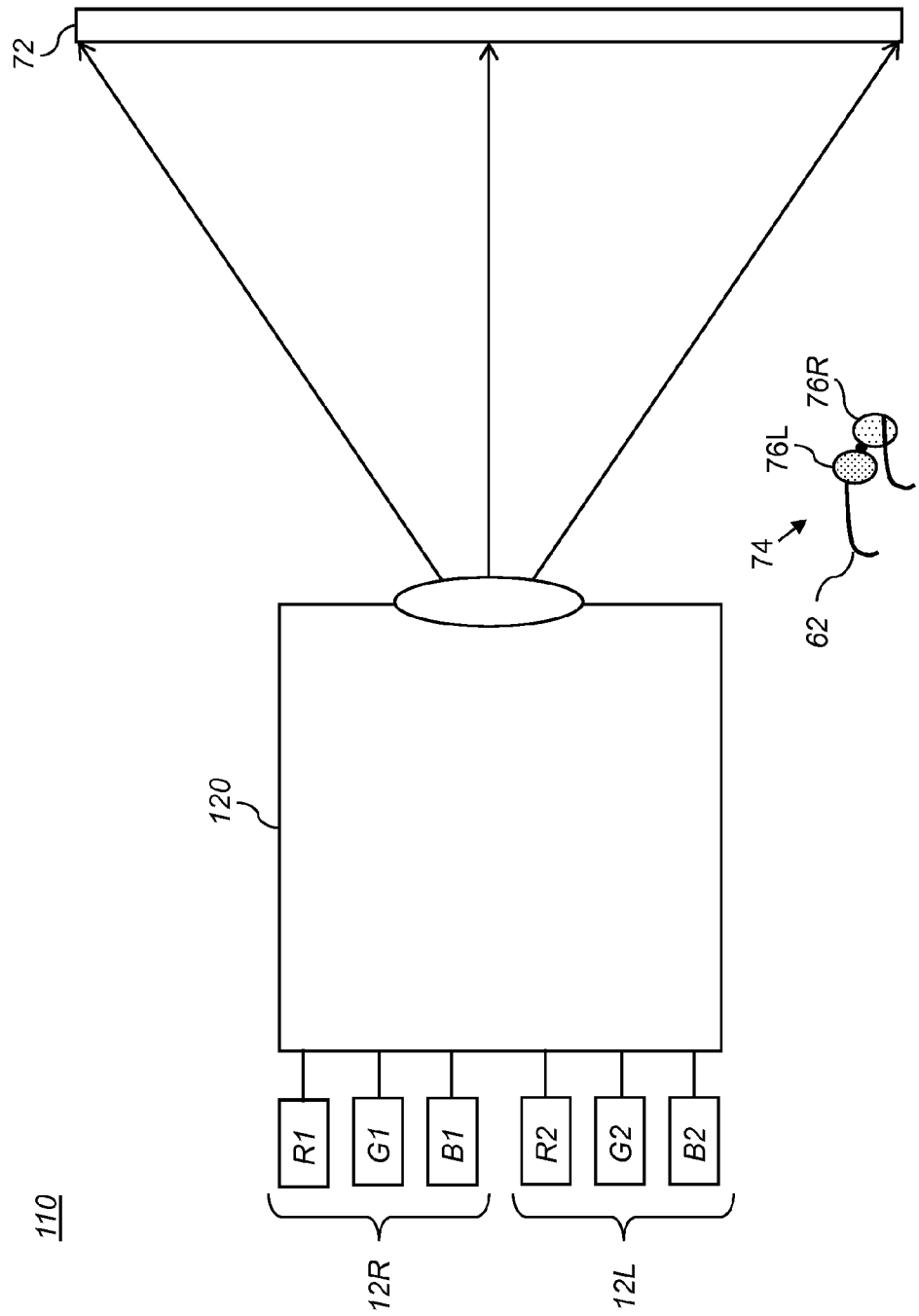
FIG. 2 is a schematic block diagram that shows a stereoscopic projection apparatus that uses spectral separation for left- and right-eye images.

FIG. 2 is a schematic block diagram of an image-forming system that illustrates some of the major components of a stereoscopic digital projection system 110 including a projector apparatus 120 that uses spectral separation for forming left-eye and right-eye images on a viewing screen or other type of display surface 72. A first set of right-eye light emitters 12R emit light in a first red spectral band R1, a first green spectral band G1, and a first blue spectral B1. The right-eye light emitters 12R are used to form a right-eye image for viewing by an observer's right eye. Similarly, a second set of left-eye light emitters 12L emit light in a second red spectral band R2, a second green spectral band G2, and a second blue spectral B2. The left-eye light emitters 12L are used to form a left-eye image for viewing by an observer's left eye.

In a preferred embodiment, the spectral bands associated the left-eye light emitters 12L and the right-eye light emitters 12R are all substantially non-overlapping with each other so that filter glasses 74 can be used to effectively separate the light provided by the left-eye light emitters 12L from the light provided by the right-eye light emitters 12R. By substantially non-overlapping we mean that the spectral power from one spectral band is negligible for any wavelength where another spectral band is non-negligible. Acceptable results can sometimes be obtained even when there is some small level of overlap between the spectral bands. One criterion that can be used in practice is that less than 5% of the light from one of the spectral bands should overlap with the other spectral band.

The filter glasses 74 include a left-eye filter 76L and a right-eye filter 76R, together with a frame 62 into which the left-eye filter 76L and the right-eye filter 76R are filtered are mounted. The frame 62 is adapted to position the right-eye filter 76R in front of the observer's right eye and to position the left-eye filter 76L in front of the observer's left eye. The right-eye filter 76R has spectral transmission characteristics that are adapted to transmit the light in the R1, G1 and B1 spectral bands from the right-eye light emitters 12R and to block (i.e., absorb or reflect) the light in the R2, G2 and B2 spectral bands from the left-eye light emitters 12L. Likewise, the left-eye filter 76L has spectral transmission characteristics that are adapted to transmit the light in the R2, G2 and B2 spectral bands from the left-eye light emitters 12L and to block the light in the R1, G1 and B1 spectral bands from the right-eye light emitters 12R.

Projector apparatus 120 can have two separate projector devices, one with color channels intended to serve a left-eye imaging path that projects light from the left-eye light emitters 12L and the other to serve a right-eye imaging path that projects light from the right-eye light emitters 12R. However, many designs combine the left-eye and right-eye imaging functions into a single projector, such as to take advantage of inherent alignment characteristics and to reduce the cost associated with components such as projection lenses. Subsequent description in this disclosure gives detailed information on one type of projector that combines left-eye and right-eye imaging paths using color scrolling. It can be appreciated by those skilled in the image projection arts that there are also other methods available for combining stereoscopic left-eye and right-eye images. Embodiments of the present invention can be used with any of a number of types of stereoscopic projection systems that utilize spectral separation techniques.

Figure 3A:
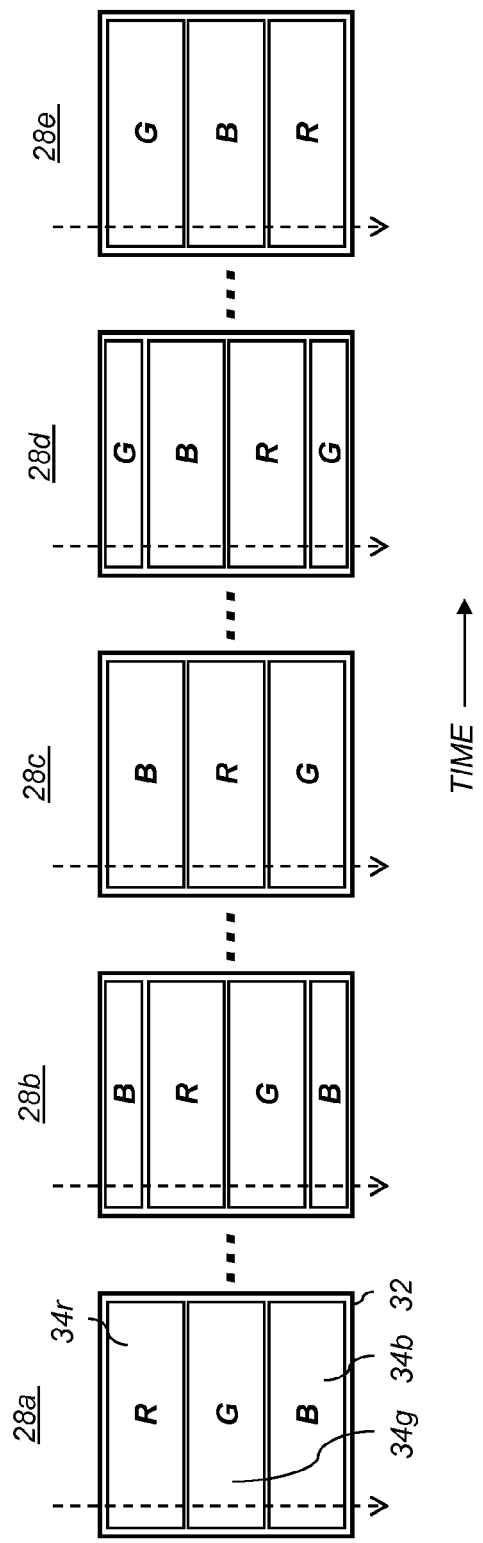
FIG. 3A is a schematic diagram showing a prior art color scrolling sequence.

The schematic diagram of FIG. 3A shows how a color scrolling sequence can be used to provide a color image from component red (R), green (G), and blue (B) light in conventional practice, for a projection apparatus that is not stereoscopic. A series of image frames 28a, 28b, 28c, 28d, and 28e are shown as they are arranged at different times. Each frame has three bands of light 34r, 34g, and 34b having red, green and blue color components, respectively, that are scanned across image region 32, moving in a vertical direction in the example shown. As a band is scrolled off the bottom of the image frame, it is scrolled into the top of the image frame so that ⅓ of the image frame is covered by each of the color components at any given time.

A vertical scrolling motion is generally preferred because horizontal scrolling can be impacted by side to side movement of the viewer whereby the color bands may become perceptible. This is often referred to as a "rainbow effect." The bands of light in this sequence can be from illumination components, scanned onto the spatial light modulator or may be imaged light from the spatial light modulator. The scanning action is cyclic, recurring at an imperceptible rate for the viewer, at a rate of many times per second (e.g., 144 Hz). As can be seen from this sequence, each image frame 28a, 28b, 28c, 28d and 28e has each of the three component colors scanned over a different image region. In the image that is formed using this sequence, each frame has red, green, and blue image content, in the respective bands of light 34r, 34g, and 34b.

It can be readily appreciated that the color scrolling scheme of FIG. 3A, while usable for non-stereoscopic color imaging, presents difficulties for stereoscopic color imaging systems. Providing stereoscopic color requires the scrolling of six different spectral bands, two for each of the component colors. Each source has its own etendue associated with it. Illuminating a single chip with six different sources, each also requiring a gap between them to prevent crosstalk and allowing for chip transition time from each of the color data associated with the particular color would quickly utilize the available etendue or require optically fast lenses. While this is feasible, it is undesirable, since projector brightness is severely constrained and cost of the optics quickly rises with such an arrangement.

To help improve image quality and deliver higher brightness, cinematic-quality projection systems for non-stereoscopic imaging often employ separate color channels for each color, typically providing each of a red, green, and blue color channel. A spatial light modulator is provided in each color channel. This arrangement enables the optical design to optimize the design and features of components, such as filters and coatings, for example, to improve their performance for light of the respective wavelengths.

Figure 3B:
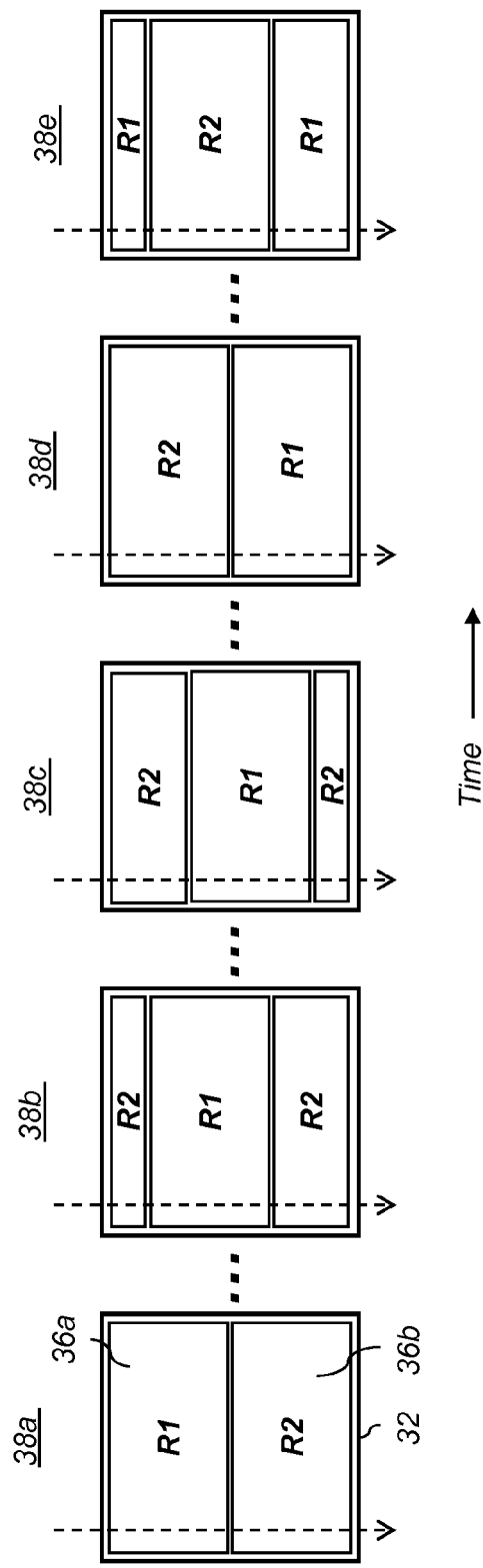
FIG. 3B is a schematic diagram showing a single-channel color scrolling sequence using spectrally-adjacent bands of color according to an embodiment of the present invention.

FIG. 3B shows a color scanning arrangement for a stereoscopic projection system according to an exemplary embodiment of the present invention. In this configuration, spectrally-adjacent spectral bands within a single component color spectrum are scrolled across the image region 32, rather than bands corresponding to the different color components as in the arrangement of FIG. 2. In this example, spectrally-adjacent red spectral bands R1 and R2 are scrolled, as bands of light 36a and 36b, across image frames 38a, 38b, 38c, 38d, and 38e according to an embodiment of the present invention. The R1 spectral band is used to provide the left-eye image and the R2 spectral band is used to provide the right-eye image for the projected stereoscopic image. Similar spectral scrolling mechanisms are provided for each color channel of the stereoscopic image, as will subsequently be described in more detail. Further by maintaining the light of the same color within its own color channel, the optical coatings for the optical components associated with a particular color component can continue to be optimized for the respective color component.

Figure 4A:
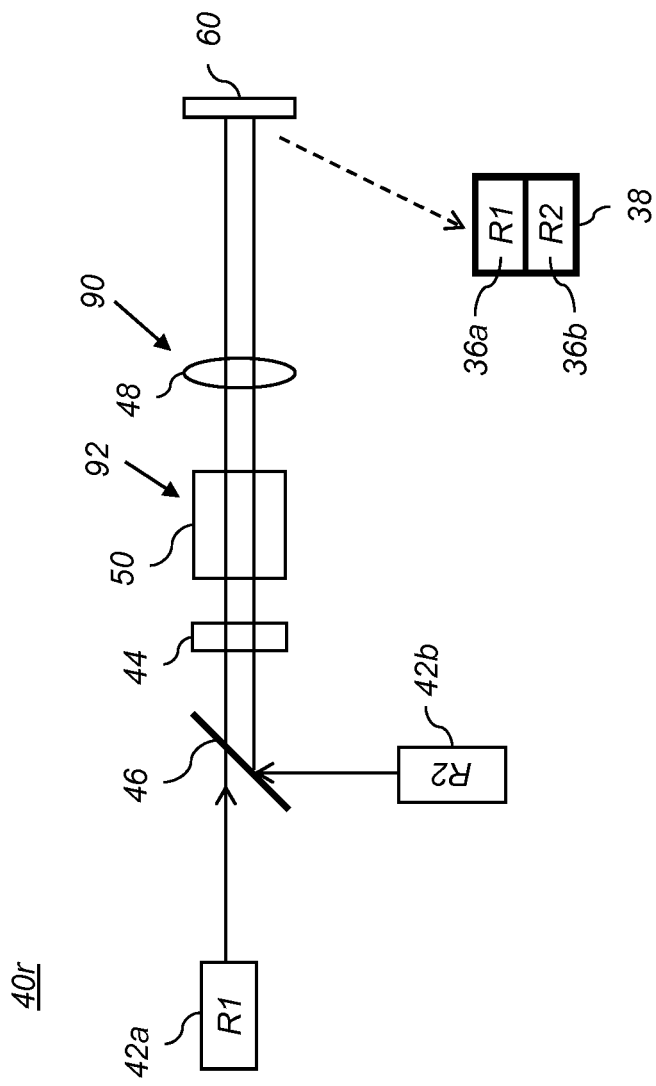
FIG. 4A is a schematic diagram that shows parts of a single color channel in a stereoscopic digital projection system that uses a single beam scanner to provide two spectrally-adjacent bands of color.
Figure 4B:
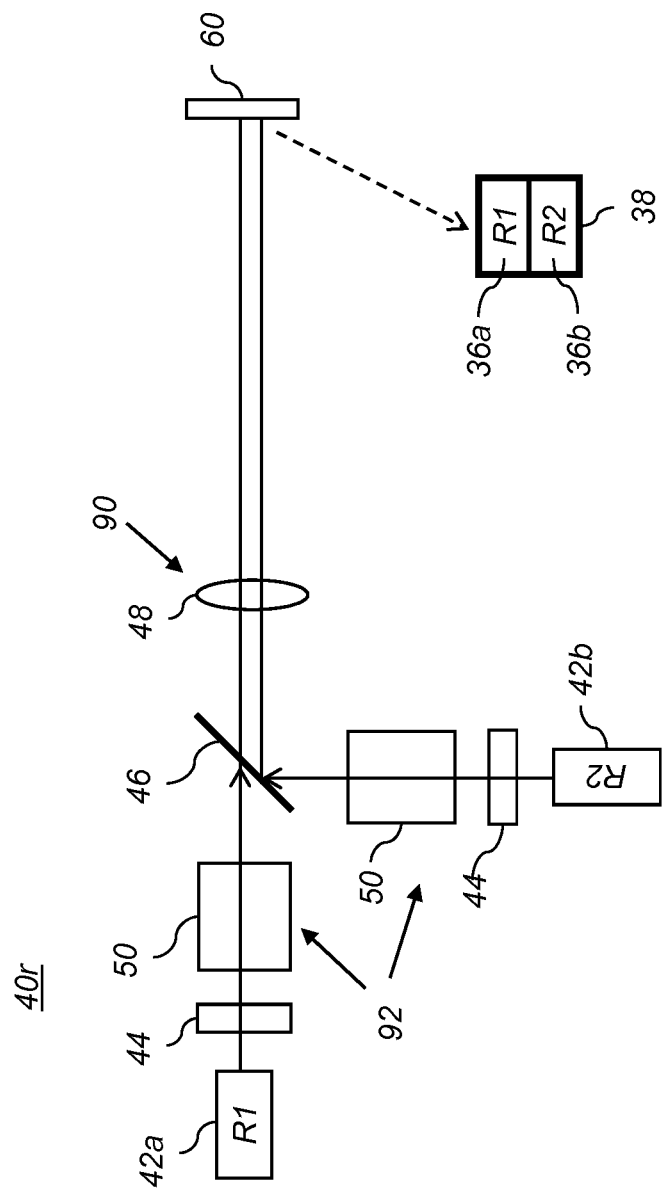
FIG. 4B is a schematic diagram that shows parts of a single color channel in a stereoscopic digital projection system that uses a separate beam scanner to provide each spectrally-adjacent band of color.

The schematic diagrams of FIGS. 4A and 4B show parts of a red color channel 40r for color scrolling spectrally-adjacent colors in a single color channel, compatible with an embodiment of the present invention. A light source 42a emits a beam of light in the R1 spectral band, and another light source 42b emits a beam of light in the R2 spectral band. Illumination optics 90 provide substantially uniform bands of light onto spatial light modulator 60 for modulation in each of the two spectrally-adjacent spectral bands. Beam scanning optics 92 including a beam scanner 50 provide the cyclical scrolling of the bands of light. It will be recognized that the illumination optics 90 can include multiple lens 48, some of which may be positioned between the uniformizing optics 44 and the beam scanning optics 92, with others being positioned between the beam scanning optics 92 and the spatial light modulator 60. In a preferred embodiment, the illumination optics 90 image an output face of the uniformizing optics 44 onto the spatial light modulator 60, thereby providing the uniform bands of light. An advantage of this approach is that the light sources 42a and 42b can be continuously on during projection, providing increased light output over other stereoscopic projection methods.

In the configuration of FIG. 4A, a beam combiner 46 combines the light beams from the light sources 42a and 42b onto parallel optical axes and directs the spatially-adjacent light beams into uniformizing optics 44, such as one or more lenslet arrays or uniformizing bars, to provide substantially uniform spatially-adjacent light beams. A beam scanner 50 then cyclically scrolls the combined uniformized light and directs the scrolled combined light beam onto the spatial light modulator 60 through the illumination optics 90, which provide for beam imaging, shaping and conditioning. In FIG. 4A, the illumination optics 90 are represented as lens 48; however in various embodiments the illumination optics 90 can include different (or multiple) optical components. The beam separation required to prevent crosstalk between the bands of light may be provided by use of spatial or angular separation of the incoming beams of light to beam scanner 50. In the event that differing angles are utilized, it is generally desired that another element, such as a dichroic beam combiner, be provided downstream of the beam scanner 50 to return the scanned beams of light onto parallel optical axes.

The spatial light modulator 60 forms an image frame 38 having corresponding bands of light 36a and 36b. The bands of light 36a and 36b are cyclically scrolled as described previously. The spatial light modulator 60 has an array of pixels that can be individually modulated according to image data to provide imaging light. The spatial light modulator pixels illuminated by the R1 spectral band are modulated according to image data for the left-eye image and the spatial light modulator pixels illuminated by the R2 spectral band are modulated according to image data for the right-eye image.

In the alternate configuration of FIG. 4B, separate uniformizing optics 44 and beam scanners 50 are utilized in the light beams from each of the light sources 42a and 42b to provide two scanned light beams. A beam combiner 46 then combines the scanned light beams to form a combined scanned light beam, which is directed onto the spatial light modulator 60 using illumination optics 90. In this case the beam scanning optics 92 includes both beam scanners 50.

Figure 5:
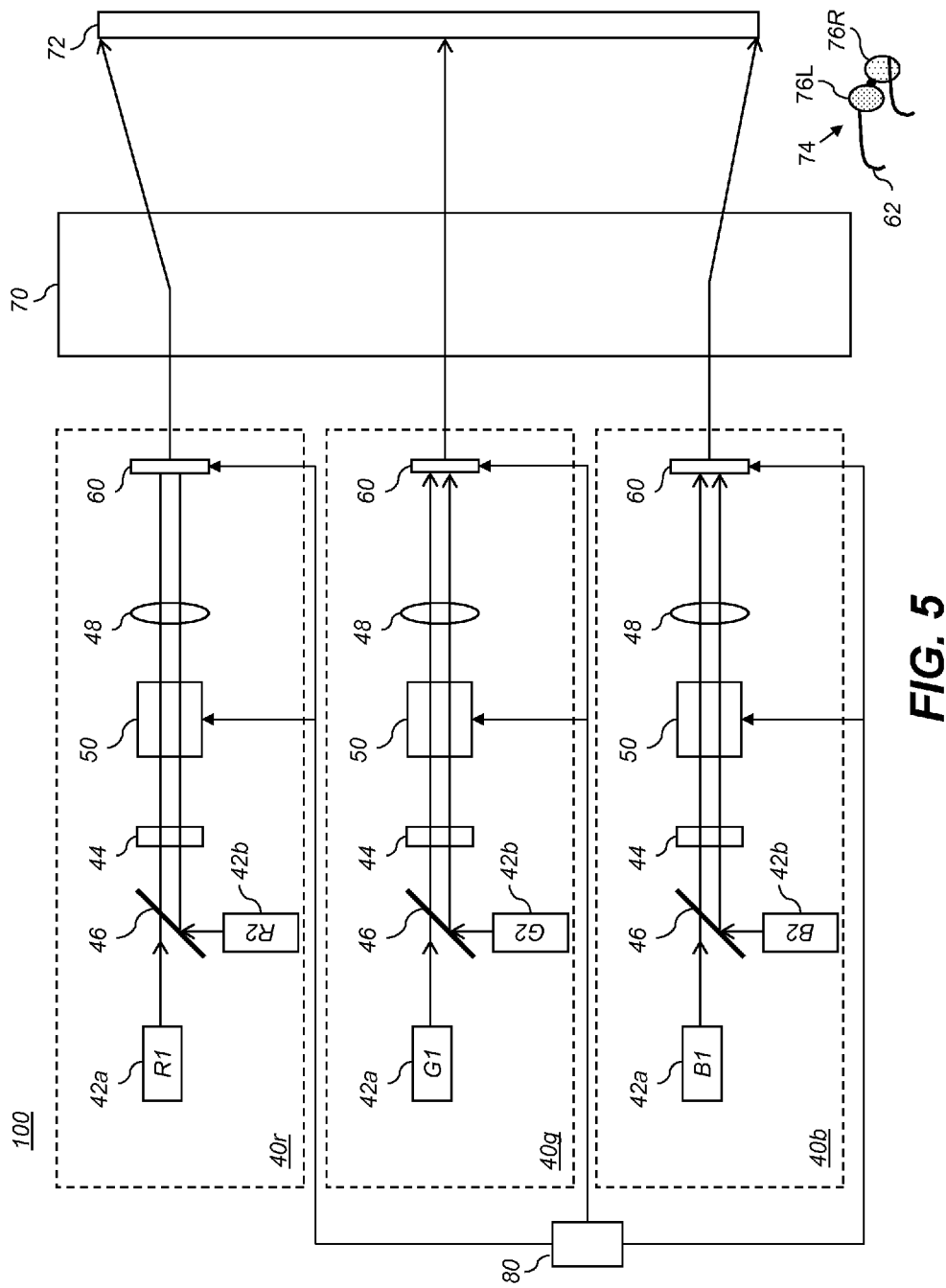
FIG. 5 is a schematic diagram showing a stereoscopic digital projection system having three color channels, each using the configuration of FIG. 4A.

The schematic diagram of FIG. 5 shows a stereoscopic digital projection system 100 that has three color channels (i.e., red color channel 40r, a green color channel 40g, and a blue color channel 40b). The red color channel 40r includes spectrally-adjacent red spectral bands R1 and R2; the green color channel 40g includes spectrally-adjacent green spectral bands G1 and G2; and the blue color channel 40b includes spectrally-adjacent blue spectral bands B1 and B2. Projection optics 70 deliver the imaging light from the three spatial light modulators 60 to a display surface 72. The viewer observes display surface 72 through filter glasses 74 having left-eye filter 76L for the left eye and right-eye filter 76R for the right eye. The left-eye filter 76L selectively transmits the imaging light for the left-eye image (i.e., light in the R1, G1 and B1 spectral bands), while blocking (by absorbing or reflecting) the imaging light for the right-eye image (i.e., light in the R2, G2 and B2 spectral bands). Similarly, right-eye filter 76R selectively transmits the imaging light for the right-eye image (i.e., light in the R2, G2 and B2 spectral bands), while blocking the imaging light for the left-eye image (i.e., light in the R1, G1 and B1 spectral bands).

A controller system 80 synchronously modulates the pixels of each spatial light modulator 60 according to image data for the stereoscopic image. The controller system 80 is also coupled to the beam scanners 50 so that it knows which spatial light modulator pixels are illuminated by the different spectrally-adjacent bands at any given time. The spatial light modulator pixels that are illuminated by the first spectral band are modulated according to image data for the left-eye image and the spatial light modulator pixels that are illuminated by the second spectral band are modulated according to image data for the right-eye image. Since the first and second spectral bands are continuously scrolling, the subsets of the spatial modulator pixels that are modulated with the image data for left-eye and right-eye images are continuously changing as well.

Projection optics 70 may combine the light beams from the three color channels (e.g., using beam combining optics) and project the combined beam through a single projection lens. Alternately, the projection optics 70 may use three separate projection lenses to project each of the color channels separately onto the display surface 72 in an aligned fashion.

Figure 6A:
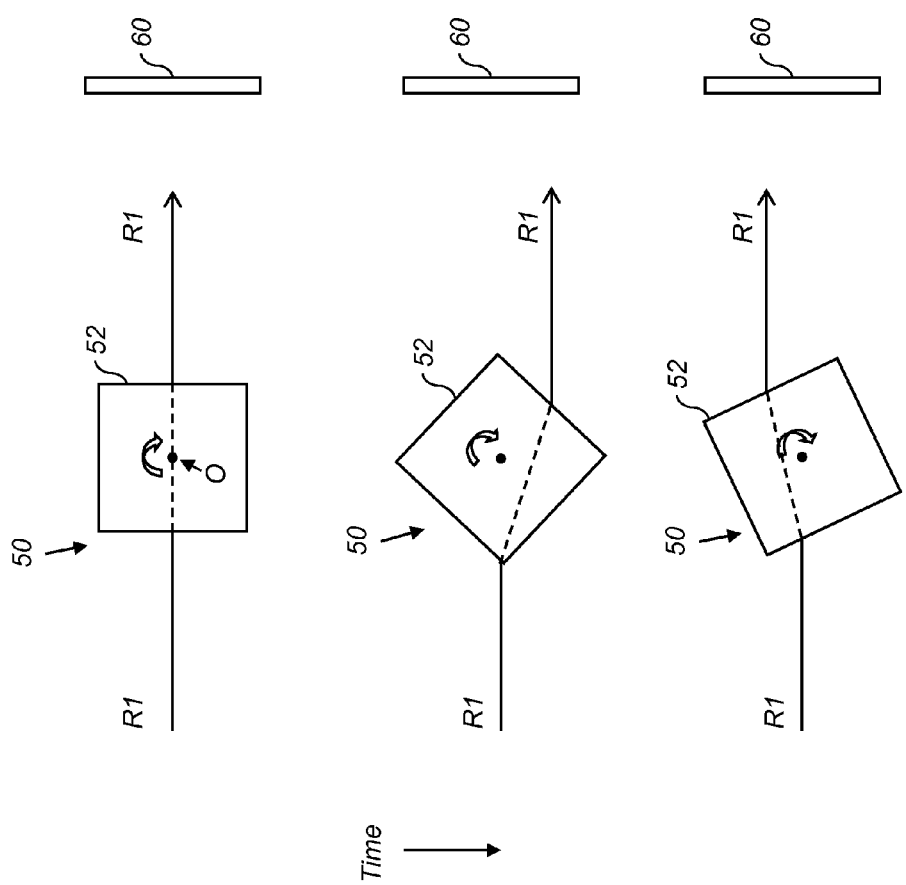
FIG. 6A is a schematic diagram that shows the use of a rotating prism for scanning a single band of color.

As noted earlier with reference to FIGS. 4A and 4B, the beam scanning optics 92 including one or more beam scanners 50 can be configured to provide band of light scrolling using a number of different arrangements, and can be positioned at any suitable point along the illumination path. Consistent with one embodiment of the present invention, FIG. 6A shows a schematic diagram of a beam scanner 50 which includes a single scanning element, namely a rotating prism 52. In this configuration, a rotating prism 52 can be provided for each of the spectrally-adjacent spectral bands in each of the component color bands. Rotation of the prism 52 redirects the light beam, shown here for the R1 spectral band, by refraction, so that the light beam position is cyclically scrolled across spatial light modulator 60. The FIG. 6A arrangement is used, for example, in the color channel embodiment shown in FIG. 4B.

In the top diagram of FIG. 6A, the prism 52 is positioned so that the incident beam is normally incident on a face of the prism. In this case the light beam passes through the prism 52 in an undeflected fashion. In the middle diagram, the prism 52 has been rotated around axis O so that the light beam is incident at an oblique angle onto the face of the prism. In this case, the beam is refracted downward so that it intersects the spatial light modulator at a lower position. In the lower diagram, the prism 52 has been rotated so that the incident beam now strikes a different facet of the prism 42. In this case, the beam is refracted upward so that it intersects the spatial light modulator 60 at a higher position. It should be noted that the incident beam will generally have a substantial spatial (and angular) extent so that at some prism orientations some of the light rays in the incident beam may strike different faces of the prism. In this way, some of the light rays will be deflected upwards, while others may be deflected downwards. This provides for the band of light to be split between the upper and lower portions of the image frame as shown in image frame 38e of FIG. 3B.

Figure 6B:
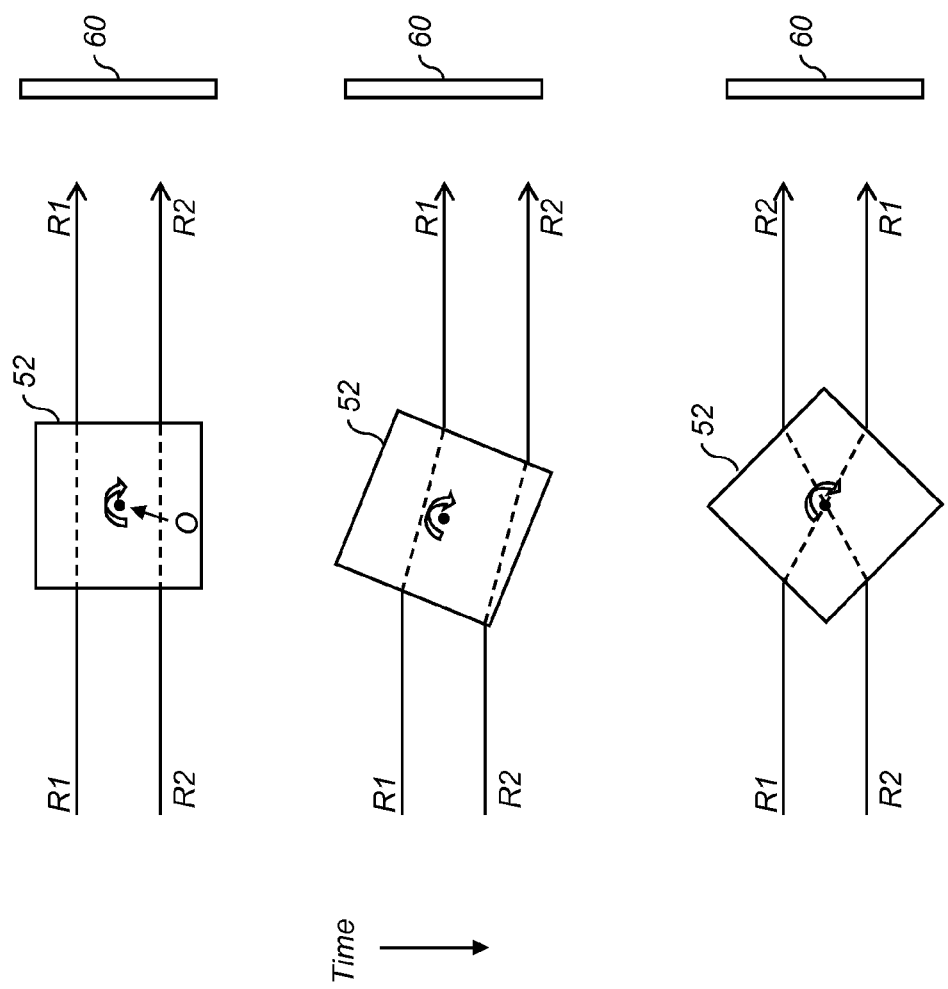
FIG. 6B is a schematic diagram that shows the use of a rotating prism for scanning two bands of color.

FIG. 6B is a schematic diagram that shows an alternate embodiment for beam scanner 50, in which a rotating prism 52 simultaneously scans the bands of light for both of the spectrally-adjacent spectral bands in a single color channel (in this example spectral bands R1 and R2). This configuration is appropriate for use in the example embodiment of FIG. 4A. In this case, light beams for both of the R1 and R2 spectral bands are incident on the prism 52. As the prism 52 rotates, both of the light beams are simultaneously redirected by refraction.

Figure 6C:
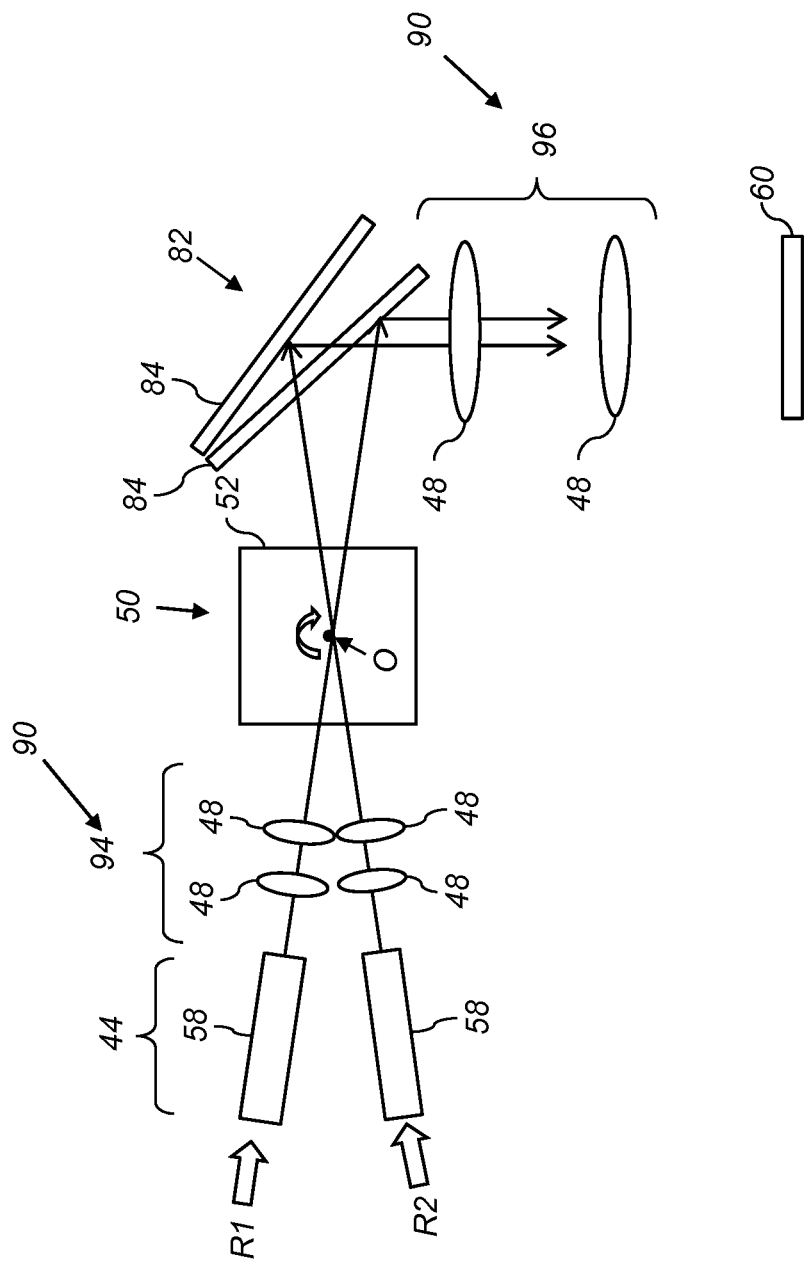
FIG. 6C is a schematic diagram showing another configuration for using a rotating prism for scanning two bands of color.

FIG. 6C is a schematic diagram that shows another alternate embodiment for beam scanner 50, in which a rotating prism 52 simultaneously scans the bands of light for both of the spectrally-adjacent spectral bands in a single color channel (in this example spectral bands R1 and R2). In this case, the beams of light incident on the rotating prism come from two different angular directions. Uniformizing optics 44 are used to uniformize each of the spectrally-adjacent light beams. In this example, the uniformizing optics 44 include integrating bars 58. The illumination optics 90 are split into a first stage 94 and a second stage 96, each including a plurality of lenses 48. In this configuration, the lenses 48 in the first stage 94 are arranged to provide telecentricity between the output face of the integrating bars 58 and the prism 52. Similarly, the lenses 48 in the second stage 96 are arranged to provide telecentricity between the prism 52 and the spatial light modulator 60. A dichroic combiner 82, including one or more dichroic surfaces 84, is used to direct the scanned light beams onto parallel optical axes for illuminating the spatial light modulator 60.

The multi-angle geometry of FIG. 6C is similar to that taught by Conner in U.S. Pat. No. 7,147,332, entitled "Projection system with scrolling color illumination." Conner teaches a projection system having a scrolling prism assembly to simultaneously illuminate different portions of a spatial light modulator with different color bands. White light is divided into different color bands that propagate through the scrolling prism in different directions. The scrolled color bands are reflectively combined so that the different color bands pass out of the scrolling prism assembly parallel. However, Conner does not teach scrolling spectrally-adjacent spectral bands from independent light sources to provide for stereoscopic projection.

A rotating prism or other refractive element is one type of device that can be used for the beam scanner 50. The term "prism" or "prism element" is used herein as it is understood in optics, to refer to a transparent optical element that is generally in the form of an n-sided polyhedron with flat surfaces upon which light is incident and that is formed from a transparent, solid material that refracts light. It is understood that, in terms of shape and surface outline, the optical understanding of what constitutes a prism is less restrictive than the formal geometric definition of a prism and encompasses that more formal definition. While FIGS. 6A-6C depict a rectangular prism with a square cross-section, in many instances it is desired to have more than four facets in order to provide improved scanning results. For example, a hexagonal prism, or an octagonal prism can be used in various embodiments.

Alternate types of components that can be utilized for beam scanner 50 include rotating mirrors or other reflective components, devices that translate across the beam path and provide variable light refraction, reciprocating elements, such as a galvanometer-driven mirror, or pivoting prisms, mirrors, or lenses.

When multiple beam scanners 50 are utilized, it is critical to synchronize the rotation of all of the beam scanners 50, and subsequently the image data associated with the different spectral bands. One method, not depicted, is to configure the optical arrangement such that a single motor is used to control the moving optical elements for at least two of the beam scanners 50. For example a single axle can be used to drive multiple prisms 52 using a single motor. In some embodiments, a single rotating prism 52 can be used to scan multiple spectral bands by directing light beams through the prism 52 from multiple directions, or by directing light beam through different portions of the prism 52 (as shown in FIG. 6B).

As shown in the examples of FIGS. 4A, 4B, and 5, beam paths for the spectrally-adjacent spectral bands can be aligned with each other to illuminate spatial light modulator 60 using the beam combiner 46. The beam combiner 46 can be a dichroic beam combiner, or can use any other type of beam combining optics known in the art.

The uniformizing optics 44 condition the light beams from the light sources 42a and 42b to provide substantially uniform beams of light for scanning. In the context of the present disclosure, the term "substantially uniform" means that the intensity of the beam of light incident on the spatial light modulator 20 appears to be visually uniform to an observer. In practice, the intensity of the uniformized light beams should be constant to within about 30%, with most of the variation occurring being a lower light level toward the edges of the uniformized light beams. Any type of uniformizing optics 44 known in the art can be used, including integrating bars or lenslet arrays.

Figure 7B:
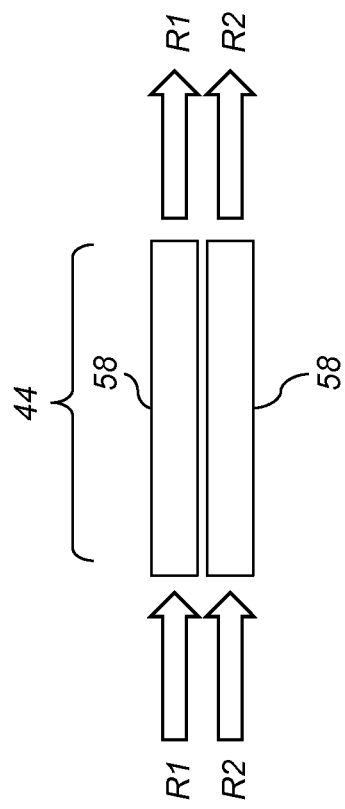
FIG. 7B is a schematic diagram that shows uniformizing optics including two integrating bars.
Figure 7A:
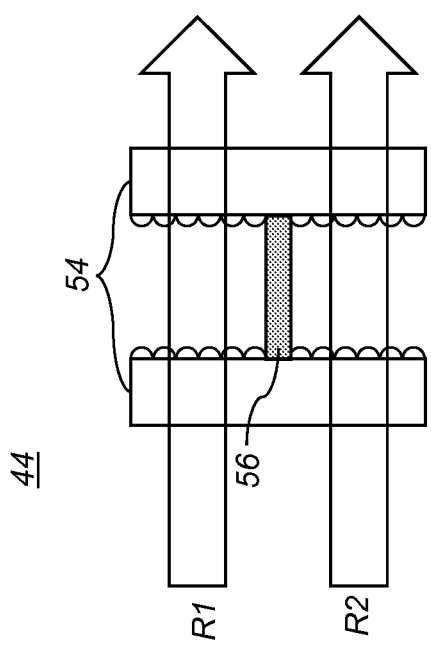
FIG. 7A is a schematic diagram that shows uniformizing optics including two lenslet arrays.

FIG. 7A shows an example of uniformizing optics 44 that can be used for the embodiment of FIG. 4A. The uniformizing optics 44 use a pair of lenslet arrays 54 to uniformized the light beams. One of the spatially-adjacent light beams (e.g., for the R1 spectral band) is passed through the top half of the lenslet arrays 54, while the other spatially-adjacent light beam (e.g., for the R2 spectral band) passes through the bottom half of the lenslet arrays 54. An opaque block 56 is provided between the light beams for the spectrally-adjacent spectral bands, to help prevent crosstalk. In this manner a single lenslet array structure may be utilized per color band thereby reducing costs.

FIG. 7B shows another example of uniformizing optics 44 that can be used for the embodiment of FIG. 4A. In this case, the uniformizing optics 44 use a pair of integrating bars 58 to uniformized the light beams. One of the spatially-adjacent light beams (e.g., for the R1 spectral band) is passed through the upper integrating bar 58, while the other spatially-adjacent light beam (e.g., for the R2 spectral band) passes through the lower integrating bar 58.

Figure 8:
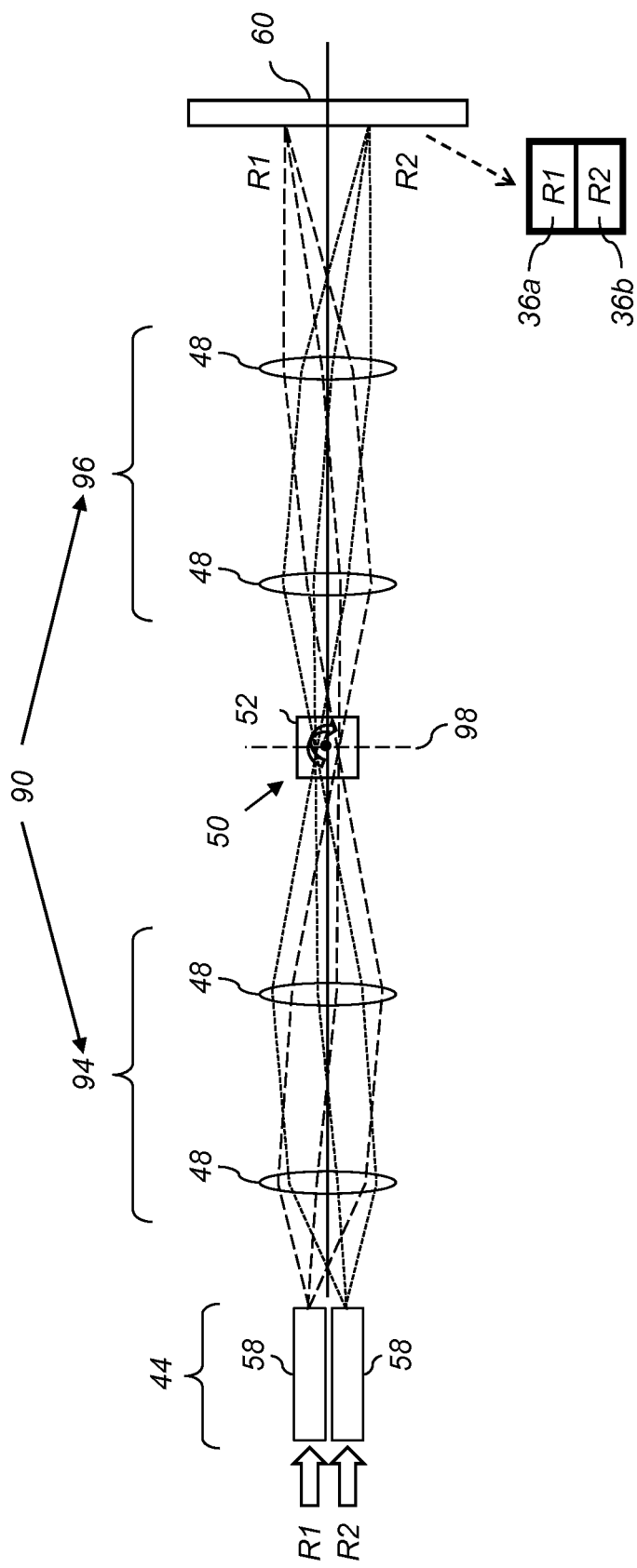
FIG. 8 is a schematic diagram showing a beam scanning configuration according to an embodiment of the present invention.

As mentioned earlier, in a preferred embodiment, the output face(s) of the uniformizing optics 44 are imaged onto the spatial light modulator 60 using the illumination optics 90, where the imaging light passes through the beam scanning optics 92. It will be obvious to one skilled in the art that many different configurations for the illumination optics 90 can be used to provide this feature. FIG. 8 shows one embodiment where the illumination optics 90 are divided into first stage 94 and second stage 96, each including two lenses 48. The lenses 48 in the first stage 94 form an image of the output faces of integrating bars 58 at an intermediate image plane 98 corresponding to the position of the prism 52, which is a component of the beam scanner 50. The second stage 96 forms an image of the intermediate image plane 98 onto the spatial light modulator 60, thereby providing substantially-uniform bands of light 36a and 36b. The bands of light are scanned across the spatial light modulator as the prism 52 is rotated. The lenses 48 can be used to adjust the magnification of the intermediate image according to the size of the prism 52, and to adjust the magnification of the scanned bands of light according to the size of the spatial light modulator 60.

The controller system 80 (FIG. 5) synchronously modulates the pixels of each spatial light modulator 60 according to image data for the stereoscopic image. Logic in the controller system 80 coordinates the image data for the left- and right-eye image content with the corresponding positions of each band of light 36a and 36b. The controller system 80 may be a computer or dedicated processor or microprocessor associated with the projector system, for example, or may be implemented in hardware.

Embodiments of the present invention are well suited to using solid-state light sources such as lasers, light-emitting diodes (LEDs), and other narrow-band light sources, wherein narrow band light sources are defined as those having a spectral bandwidth of no more than about 15 nm FWHM (full width half maximum), and preferably no more than 10 nm. Other types of light sources that could be used include quantum dot light sources or organic light emitting diode (OLED) light sources. In still other embodiments, one or more white light sources could be used, along with corresponding filters for obtaining the desired spectral content for each color channel. Methods for splitting polychromatic or white light into light of individual color spectra are well known to those skilled in the image projection arts and can employ standard devices such as X-cubes and Phillips prisms, for example, with well-established techniques for light conditioning and delivery.

The use of lasers provides a significant advantage in reducing the bandwidth of the spectrally-adjacent spectral bands, thereby allowing more separation between the adjacent bands and increased color gamut. This is desirable in that the filters on each eye are inevitably sensitive to angle whereby the wavelength of the filter edge transitions shift due to non-normal incidence. This angular sensitivity is a commonly known problem in all optical filter designs. Therefore using a reduced bandwidth emission helps to solve this problem enabling this common shift to occur without substantially impacting crosstalk. Many lasers have bandwidths on the order of 1 nm. While this may seem ideal, there are other factors, such as speckle reduction, which benefit from broader spectral bands. (Speckle is produced by the interference of coherent light from defects on optical components.) While speckle can occur using any type of light source, it is most pronounced with narrow band light sources such as LEDs, and even more so with Lasers. A more desirable bandwidth would fall between 5-10 nm as a compromise to provide adequate spectral separation while reducing the sensitivity to speckle. A spectral separation of between 15-20 nm is generally sufficient to mitigate the filter angular sensitivity issues.

Figure 9:
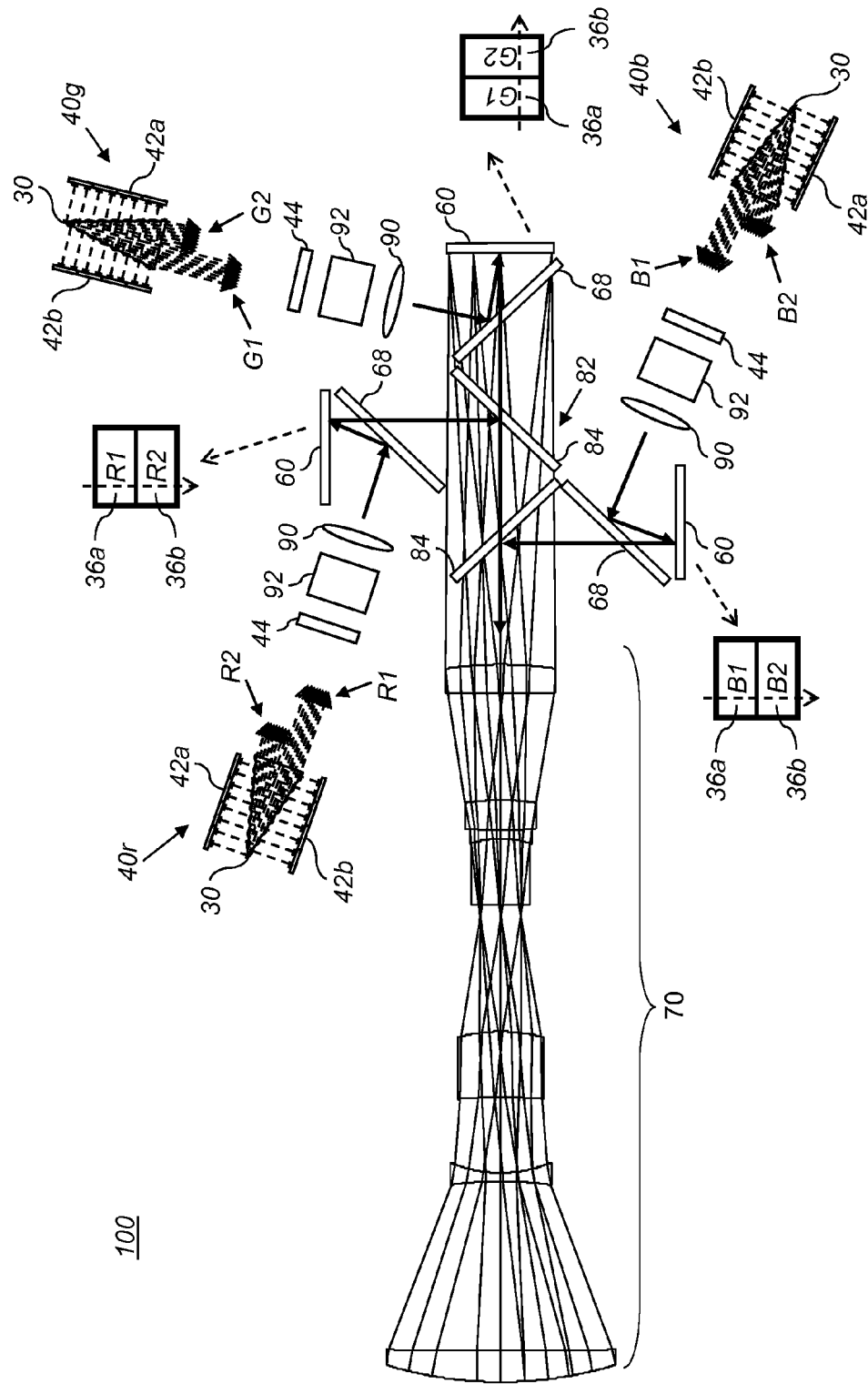
FIG. 9 is a schematic diagram of a stereoscopic color scrolling digital projection system having three color channels and using combining optics for arrays of solid-state light emitters.

The schematic diagram of FIG. 9 shows a stereoscopic digital projection system 100 using a common optical path for projection optics 70. The stereoscopic digital projection system includes a red color channel 40r, a green color channel 40g and a blue color channel 40b. Each color channel includes one or more arrays of light sources (e.g., laser array sources) for each of a pair of spectrally-adjacent spectral bands. Light sources 42a emit light beams in the left-eye spectral bands (R2, G2 and B2), and light sources 42b emit light in the spectrally-adjacent right-eye spectral bands (R1, G1 and B1). Light-redirecting prisms 30 are used in each color channel to redirect the light beams from the light sources 42a and 42b into a common direction to form a combined light beam including spatially-adjacent light beams for the right-eye and left-eye spectral bands (e.g., the R1 and R2 spectral bands). The light beams from the right-eye spectral band (e.g., the R1 spectral) will be grouped on one side of the combined light beam, and the light beams from the left-eye spectral band (e.g., the R2 spectral) will be grouped on the other side of the combined light beam. One type of light-redirecting prism 30 that can be used for this purpose is described in the aforementioned, commonly-assigned, co-pending U.S. Patent Application Publication 2009/0153752 entitled "Projector using independent multiple wavelength light sources" by Silverstein, which is incorporated herein by reference.

The combined light beam for each component color channel is directed through uniformizing optics 44, beam scanning optics 92 and illumination optics 90, and is reflected from dichroic surface 68 to provide scanned first and second bands of light 36a and 36b onto the corresponding spatial light modulators 60. A controller system 80 (FIG. 5) synchronously modulates the spatial light modulator pixels according to image data for the stereoscopic image, wherein the spatial light modulator pixels illuminated by the first band of light (e.g., R1) are modulated according to image data for the left-eye image and the spatial light modulator pixels illuminated by the second band of light (e.g., R2) are modulated according to image data for the right-eye image.

The modulated imaging light beams provided by the spatial light modulators 60 are transmitted through the dichroic surfaces 68 and are combined onto a common optical axis using a dichroic combiner 82 having multiple dichroic surfaces 84. The combined light beam is projected onto a display surface (not shown) using the projection optics 70 for viewing by observers wearing filter glasses 74 (FIG. 5).

The embodiment illustrated in FIG. 9 uses three spatial light modulators 60, one for each component color channel (i.e., red, green and blue). Each spatial light modulator 60 is illuminated with scrolling bands of light having spectrally-adjacent spectral bands within a particular component color channel. The spatial light modulators tend to be one of the more expensive and complex components of the stereoscopic digital projection system 100.

Figure 10:
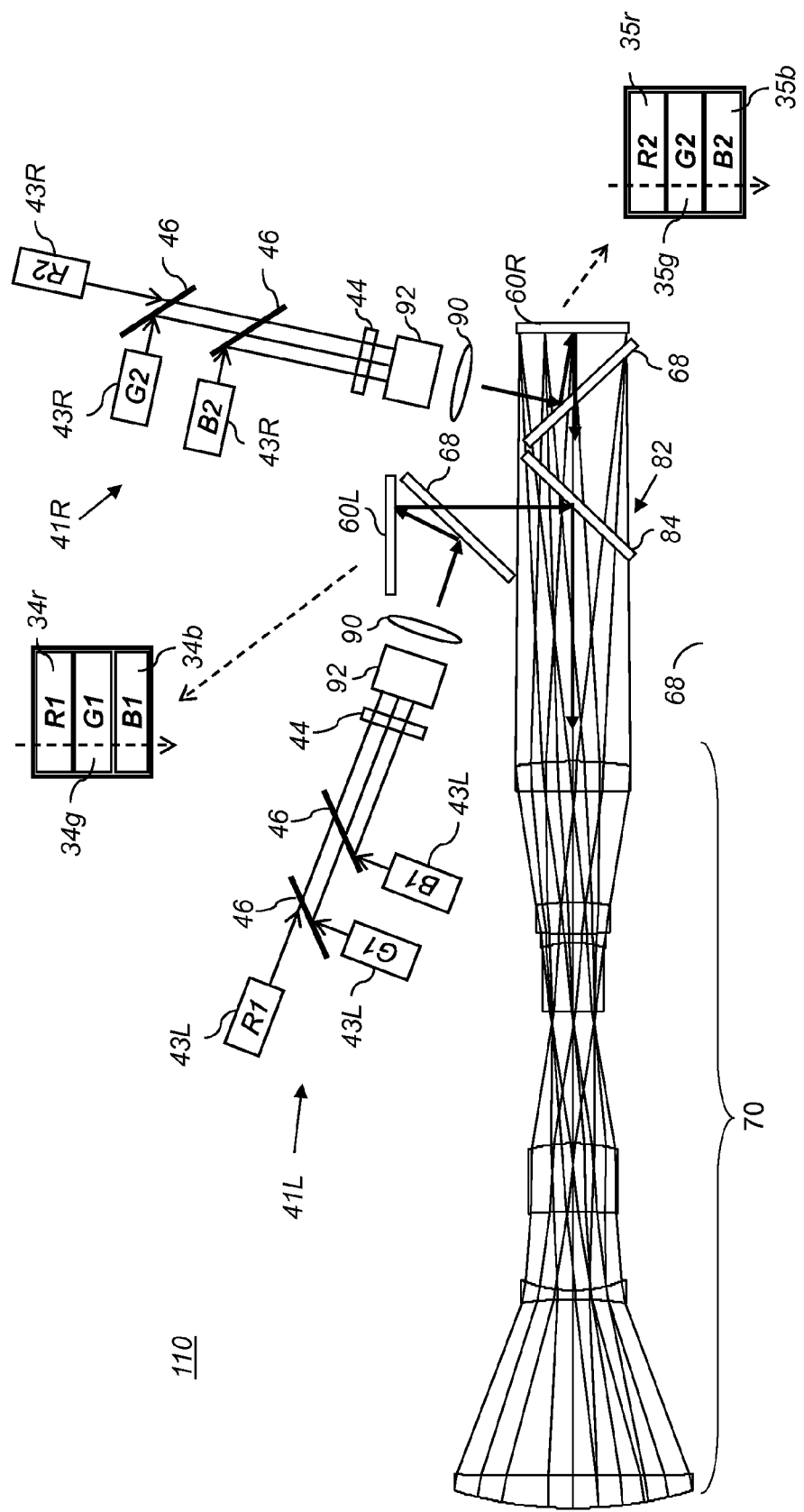
FIG. 10 is a schematic diagram of a stereoscopic color scrolling digital projection system having three color channels according to an alternate embodiment using two spatial light modulators.

FIG. 10 illustrates a schematic diagram for an alternate embodiment of a stereoscopic digital projection system 110 that utilizes only two spatial light modulators 60L and 60R, one associated with a left-eye image forming system 41L and one associated with a right-eye image forming system 41R. The left-eye image forming system 41L includes three left-eye light sources 43L, one for each component color spectrum (R1, G1 and B1). Similarly, the right-eye image forming system 41R includes three right-eye light sources 43R, one for each component color spectrum (R2, G2 and B2). The right-eye light sources 43R are spectrally-adjacent to the corresponding left-eye light sources 43L.

Each of the image forming systems include uniformizing optics 44, beam scanning optics 92, illumination optics 90 and a dichroic surface 68 to direct the scanned beams of light onto spatial light modulators 60L and 60R. In this case, the left-eye image forming system 41L provides three scanned bands of light 34r, 34g and 34b, corresponding to the red, green and blue spectral bands (R1, G1 and B1), respectively. Likewise, the right-eye image forming system 41R provides three scanned bands of light 35r, 35g and 35b, corresponding to the red, green and blue spectral bands (R2, G2 and B2), respectively.

A controller system (not shown) synchronously modulates the pixels of the spatial light modulator 60L in the left-eye image forming system 41L according to image data for the left-eye image, wherein the pixels illuminated by the each band of light (R1, G1 and B1) are modulated according to the image data for the corresponding color channel of the left-eye image. Likewise, the controller system synchronously modulates the pixels of the spatial light modulator 60R in the right-eye image forming system 41R according to image data for the right-eye image, wherein the pixels illuminated by the each band of light (R2, G2 and B2) are modulated according to the image data for the corresponding color channel of the left-eye image.

A dichroic combiner 82 including a dichroic surface 84 is used to combine the imaging light from the left-eye image forming system 41L and the right-eye image forming system 41R onto a common optical axis for projection onto a display surface using projection optics 70. The dichroic surface 84 is preferably a spectral comb filter having a series of notches that transmits the spectral bands (R2, G2 and B2) corresponding to the imaging light for the right-eye light sources 43R while reflecting the spectral bands (R1, G1 and B1) corresponding to the imaging light for the left-eye light sources 43L. Spectral comb filters can be fabricated using any technique known in the art, such as multi-layer thin-film dichroic filter coating methods and co-extruded stretched polymer film structure fabrication methods. Another type of dichroic filter that can be used to provide a spectral comb filter for use as dichroic surface 84 is a rugate filter design. Rugate filters are interference filters that have deep, narrow rejection bands while also providing high, flat transmission for the rest of the spectrum. Rugate filters are fabricated using a manufacturing process that yields a continuously varying index of refraction throughout an optical film layer. Rugate filters feature low ripple and no harmonic reflections compared to standard notch filters, which are made with discrete layers of materials with different indices of refraction.

By way of example, and not by way of limitation, Tables 1 and 2 list example spectrally-adjacent spectral bands according to embodiments of the present invention.

TABLE 1

Exemplary interleaved spectrally-adjacent spectral bands

| Component Color | Right-Eye Image Spectral Bands | Left-Eye Image Spectral Bands |
|---|---|---|
| Red | 625-640 nm | 655-670 nm |
| Green | 505-520 nm | 535-550 nm |
| Blue | 442-456 nm | 470-484 nm |

TABLE 2

Exemplary non-interleaved spectrally-adjacent spectral bands

| Component Color | Right-Eye Image Spectral Bands | Left-Eye Image Spectral Bands |
|---|---|---|
| Red | 625-640 nm | 655-670 nm |
| Green | 535-550 nm | 505-520 nm |
| Blue | 442-456 nm | 470-484 nm |

Figure 11A:
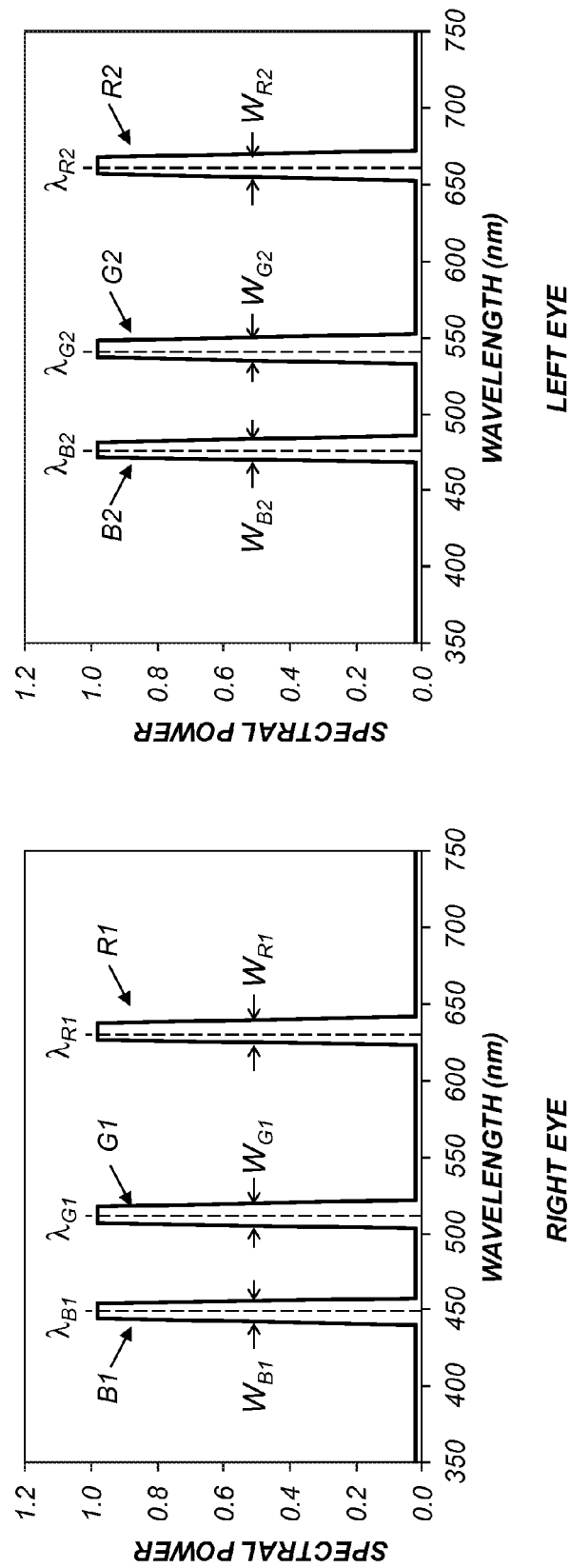
FIG. 11A is a graph that shows spectral bands for stereoscopic projection using spectral separation in an interleaved arrangement.

FIG. 11A shows spectral bands R1, G1, and B1 for the right eye and spectral bands R2, G2, and B2 for the left eye for each component color according to the Table 1 arrangement. Each of the spectral bands has a corresponding central wavelength ($\lambda_{R1}, \lambda_{G1}, \lambda_{B1}, \lambda_{R2}, \lambda_{G2}, \lambda_{B2}$) and a corresponding bandwidth ($W_{R1}, W_{G1}, W_{B1}, W_{R2}, W_{G2}, W_{B2}$). For the FIG. 11A arrangement, the spectral bands observe an interleaved ordering according to the central wavelengths for the respective spectral bands: $\lambda_{B1} < \lambda_{B2} < \lambda_{G1} < \lambda_{G2} < \lambda_{R1} < \lambda_{R2}$.

The bandwidths can be characterized using an appropriate measure of width for the spectral bands. Typically, the bandwidths are defined to be the wavelength separation between the lower edge (i.e., the "cut-on edge") of the spectral band and the upper edge (i.e., the "cut-off edge") of the spectral band. In a preferred embodiment, the bandwidths are full-width half-maximum bandwidths where the lower and upper edges correspond to the wavelengths where the spectral power in the spectral band falls to half of its peak level. In other embodiments the lower and upper edges can be determined according to other criteria. For example the edges can be defined to be the wavelengths where the spectral power falls to a specified level other than half of the peak level (e.g., the 10% power level or the 25% power level). Alternatively, the bandwidth can be characterized using some other measure of the width of the spectral band (e.g., a multiple of the standard deviation of the spectral power distribution for the spectral band).

In the example shown in FIG. 11A, the bandwidth of each spectral band is about 10-15 nm, while the separation between adjacent spectral bands is 15 nm or more. Various embodiments may use light emitters having different bandwidths, or may have different separations between the adjacent spectral bands. The minimum bandwidth for typical light emitters that would be used for digital projection systems would be about 1 nm, corresponding to the bandwidth of a single laser.

The central wavelengths of the spectral bands can be characterized using any appropriate measure of the central tendency for the spectral bands. For example, in various embodiments, the central wavelengths can be peak wavelengths of the spectral bands, centroid wavelengths of the spectral bands, or the average of the lower and upper edge wavelengths.

Figure 11B:
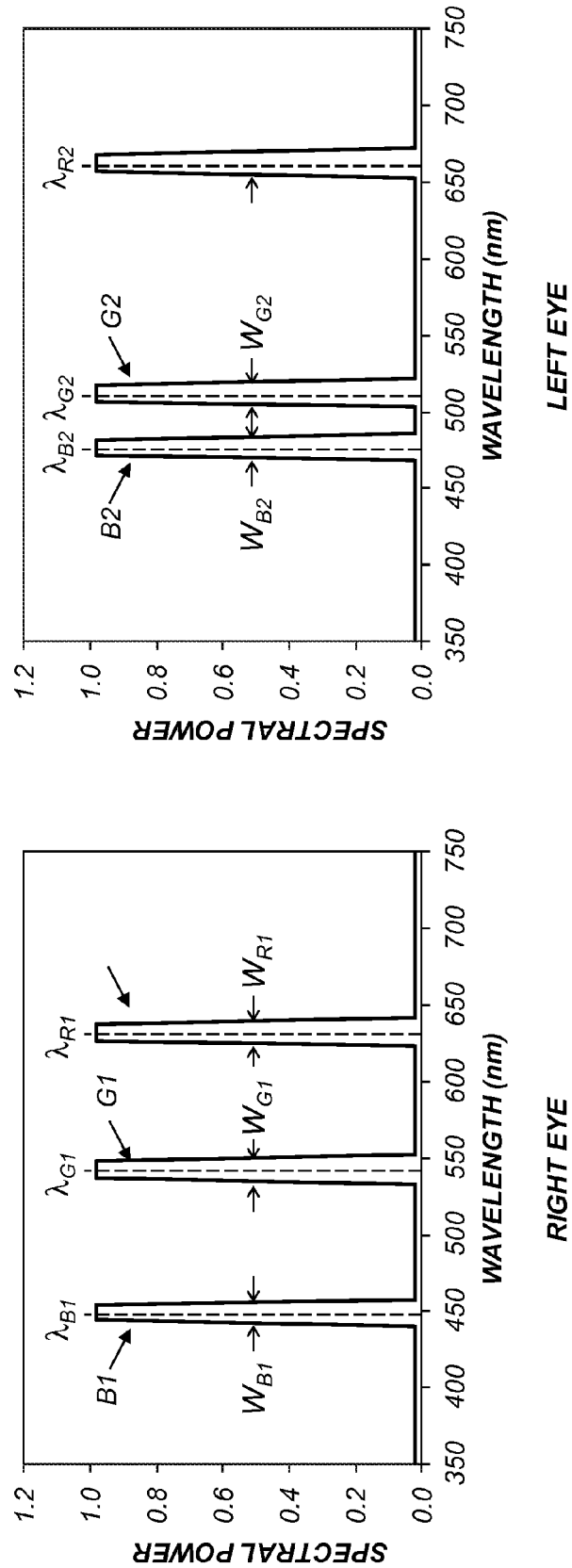
FIG. 11B is a graph that shows spectral bands for stereoscopic projection using spectral separation in an alternate non-interleaved arrangement.

FIG. 11B shows spectral bands R1, G1, and B1 for the right eye and spectral bands R2, G2, and B2 for the left eye for each component color according to the Table 2 arrangement. In this case, the spectral bands observe a non-interleaved ordering according to the central wavelengths for the respective spectral bands where: $\lambda_{B1} < \lambda_{B2} < \lambda_{G2} < \lambda_{G1} < \lambda_{R1} < \lambda_{R2}$. The rearrangement of the G1 and G2 spectral bands in the FIG. 11B arrangement relative to the ordering in the FIG. 11A arrangement is generally advantageous for simplifying filter glass coating design and for other purposes, as will subsequently be described in more detail.

It should be noted that there will generally be slight color gamut differences between right- and left-eye imaging paths associated with the use of the different red, green and blue primaries. As a result, different color processing, including white balance and color correction transforms, will generally be needed to account for the spectral bands associated with the primary colors used for left-eye and right-eye imaging paths. White balancing can be performed, for example, by adjusting the brightness of one or more light emitters, by applying transforms to individual color channels, by adjusting illumination timing or by using filtration to adjust color intensity. Color correction transforms are used to determine control signals for each of the color channels to produce a desired color appearance associated with a set of input color values. Color correction transforms will generally also include some form of gamut mapping to determine appropriate output colors for cases where the input color values are outside of the color gamut associated with the color primaries used for the left-eye and right-eye imaging paths. Color correction operations can be performed by applying color correction matrices, or by applying other forms of color transforms such as three-dimensional look-up tables (3-D LUTs). Methods for determining color transforms that are appropriate for a particular set of color primaries are well-known in the art.

Because additional spectral bands are available for wavelength-based stereoscopic imaging systems, there may be additional color gamut available that can be utilized when the system is used for non-stereoscopic imaging applications. An example of a technique that can be used for this purpose is described in commonly assigned U.S. Patent Application Publication No. 2011/0285962 entitled "2D/3D Switchable Color Display Apparatus with Narrow Band Emitters" by Ellinger et al.

Figure 12A:
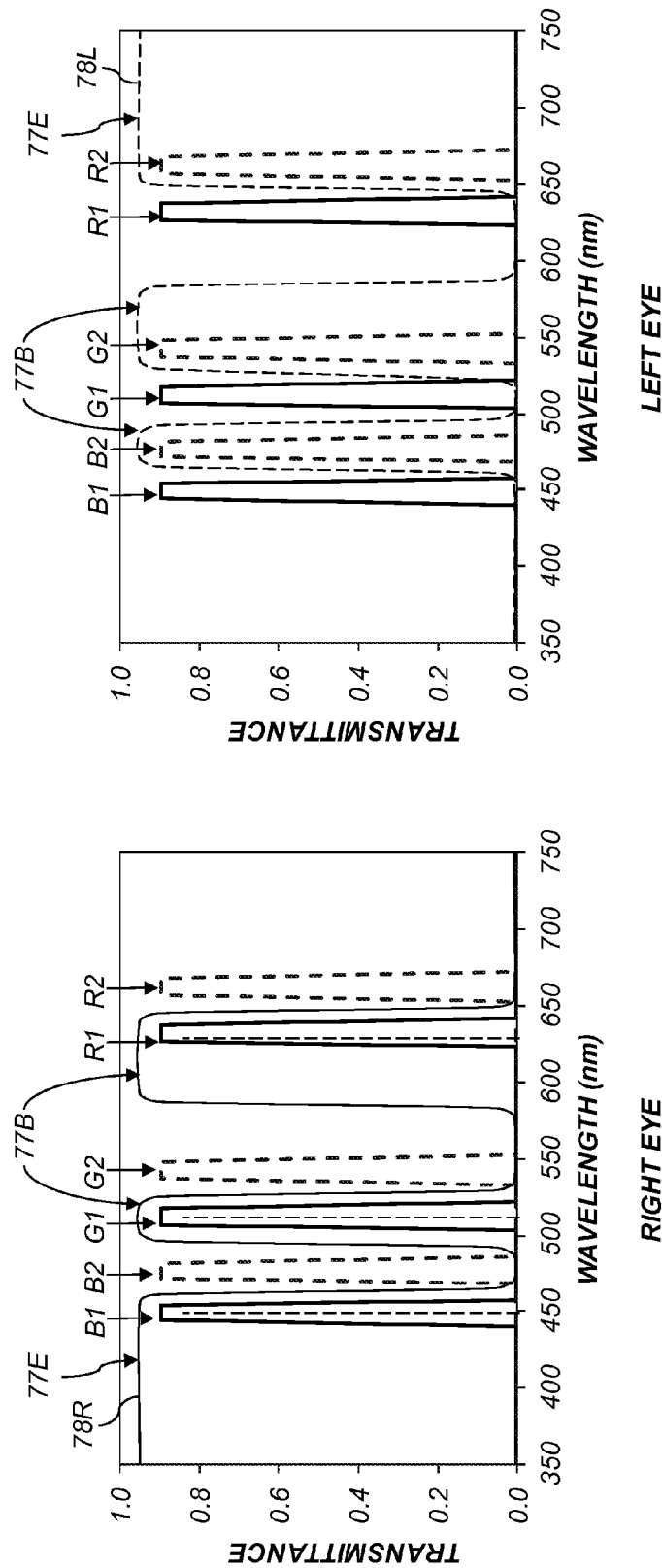
FIG. 12A is a graph that shows spectral transmittances for right-eye and left-eye filters for use with the interleaved spectral band arrangement of FIG. 3A.

The right-eye filter 76R and the left-eye filter 76L in filter glasses 74 (FIG. 5) have spectral transmittance characteristics that are designed to transmit the spectral bands associated with the corresponding left-eye or right-eye image and block the spectral bands associated with the other eye. FIG. 12A illustrates an example of a right-eye filter transmittance 78R for right-eye filter 76R and a left-eye filter transmittance 78L for left-eye filter 76L that can be used in accordance with the interleaved spectral band arrangement shown in FIG. 11A. The right-eye filter transmittance 78R transmits most of the light in the right-eye spectral bands (R1, G1, B1) while blocking most of the light in the left-eye spectral bands (R2, G2, B2). Likewise, the left-eye filter transmittance 78L transmits most of the light in the left-eye spectral bands (R2, G2, B2) while blocking most of the light in the right-eye spectral bands (R1, G1, B1). In this example, both the right-eye filter transmittance 78R and the left-eye filter transmittance 78L is a "comb filter" that includes two contiguous bandpass filter transmission bands 77B and one contiguous edge filter transmission band 77E. A transmission band is considered to be contiguous provided that it has at least some minimum specified transmission percentage (e.g., 50%) over all wavelengths within the transmission band.

The right-eye filter 76R and the left-eye filter 76L should generally be designed to transmit at least 50% of the light from the corresponding eye spectral bands in order to avoid causing a significant loss in image brightness. Preferably, this value should be 80% or higher. To prevent objectionable cross-talk, the right-eye filter 76R and the left-eye filter 76L should generally be designed to transmit less than 5% of the light from the opposite eye spectral bands. Preferably, this value should be less than 2% to ensure that the crosstalk is substantially imperceptible.

Figure 12B:
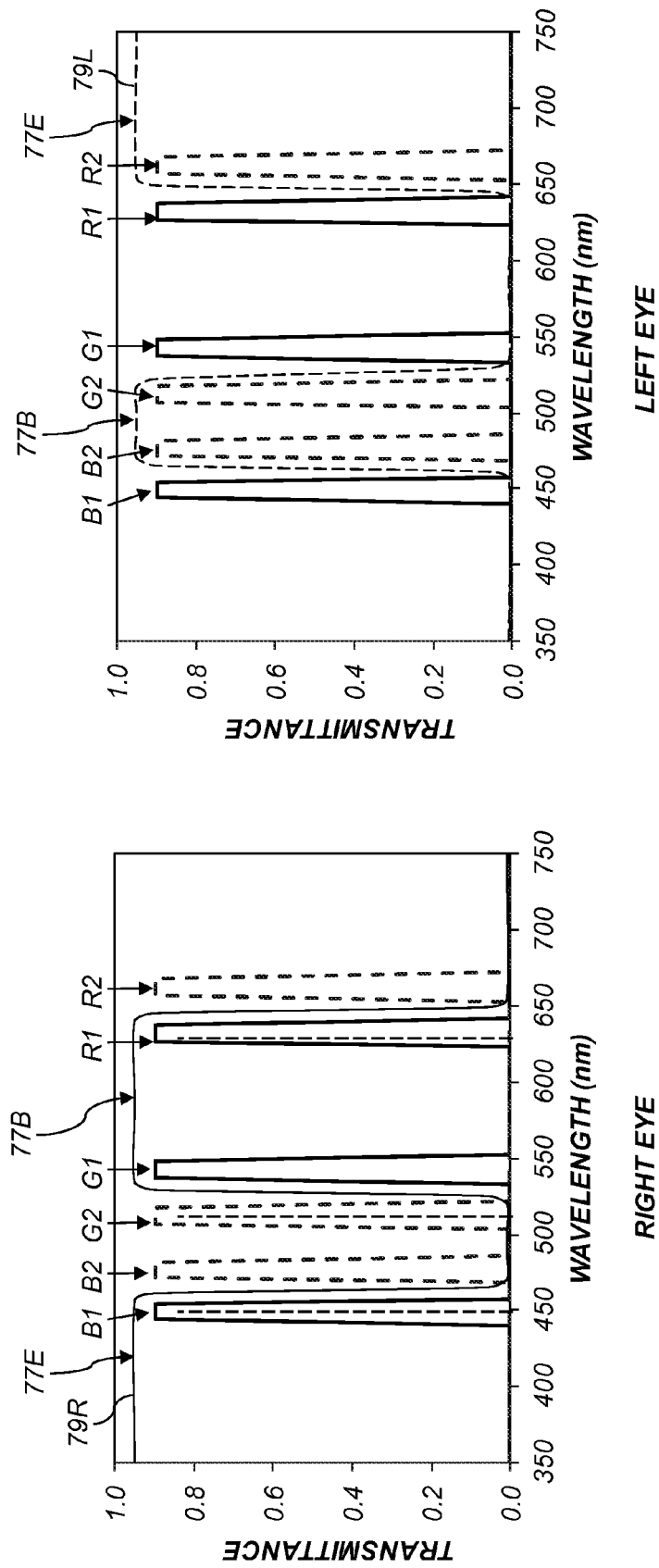
FIG. 12B is a graph that shows spectral transmittances for right-eye and left-eye filters for use with the non-interleaved spectral band arrangement of FIG. 3B.

FIG. 12B illustrates an example of a right-eye filter transmittance 79R for right-eye filter 76R and a left-eye filter transmittance 79L for left-eye filter 76L that can be used in accordance with the non-interleaved spectral band arrangement shown in FIG. 11B. In comparison to the arrangement shown in FIG. 12A, it can be seen that the filters in the arrangement of FIG. 12B have the advantage that they require fewer edge transitions. In particular, both the right-eye filter transmittance 78R and the left-eye filter transmittance 78L use only a single bandpass filter transmission band 77B, together with a single edge filter transmission band 77E. This is made possible by the fact that due to the reordering of the spectral bands there is no intervening left-eye spectral band between the right-eye green spectral band G1 and the right-eye red spectral band R1. Likewise, there is no intervening right-eye spectral band between the left-eye blue spectral band B2 and the left-eye green spectral band G2. Each of the filters in the arrangement of FIG. 12B require only three edge transitions (from low transmittance to high transmittance or from high transmittance to low transmittance), whereas the filters in the arrangement of FIG. 12A each require five edge transitions. In general, the complexity of a filter design increases with the number of edge transitions, and with the sharpness of the edge transitions that are required. The fabrication of filters with fewer bandpass filter transmission bands (and therefore fewer edge transitions) is therefore significantly less complex, requiring fewer filter layers, and as a result is less expensive. This is an important advantage since the filter glasses 74 must be manufactured in large quantities for use by each viewer in the audience who is viewing the projected stereoscopic image. Another advantage of the arrangement of FIG. 12B is that there are fewer opportunities for generating crosstalk since there are fewer edge transitions where an opposing eye spectral band can leak into a transmission band.

The left-eye filter 76L and the right-eye filter 76R in filter glasses 74 (FIG. 5) can be made using any fabrication technique known in the art. In some embodiments, one or both of the left-eye filter 76L and the right-eye filter 76R are dichroic filters that includes an optical surface having a multi-layer thin-film coating. The multi-layer thin-film coating can be designed to provide appropriate filter transmittances, such as the right-eye filter transmittance 78R and the left-eye filter transmittance 78L of FIG. 12A and the right-eye filter transmittance 79R and the left-eye filter transmittance 79L of FIG. 12B. Techniques for designing and fabricating multi-layer thin-film coatings having specified spectral transmittance characteristics are well known in the art.

In other embodiments, one or both of the left-eye filter 76L and the right-eye filter 76R are multi-layer dichroic filters that are fabricated using a co-extruded stretched polymer film structure. One method for fabricating such structures is described in U.S. Pat. No. 6,967,778 to Wheatley et al., entitled "Optical film with sharpened bandedge," which is incorporated herein by reference. According to this method, a coextrusion device receives streams of diverse thermoplastic polymeric materials from a source such as a heat plastifying extruder. The extruder extrudes a multi-layer structure of the polymeric materials. A mechanical manipulating section is used to stretch the multi-layer structure to achieve the desired optical thicknesses.

Crosstalk is an undesirable artifact that can occur in stereoscopic imaging systems where the image content intended for one of the observer's eyes is contaminated with the image content intended for the other eye. This can create the appearance of perceptible "ghost images" where the viewer sees faint images of objects in the scene that are spatially offset from the main images. To avoid objectionable crosstalk it is important that the amount of light from the left-eye light emitters 12L that is transmitted by the right-eye filter 76R is a small fraction of the amount of light from the right-eye light emitters 12R that is transmitted by the right-eye filter 76R. Likewise, the amount of light from the right-eye light emitters 12R that is transmitted by the left-eye filter 76L should be a small fraction of the amount of light from the left-eye light emitters 12L that is transmitted by the left-eye filter 76L.

Figure 13:
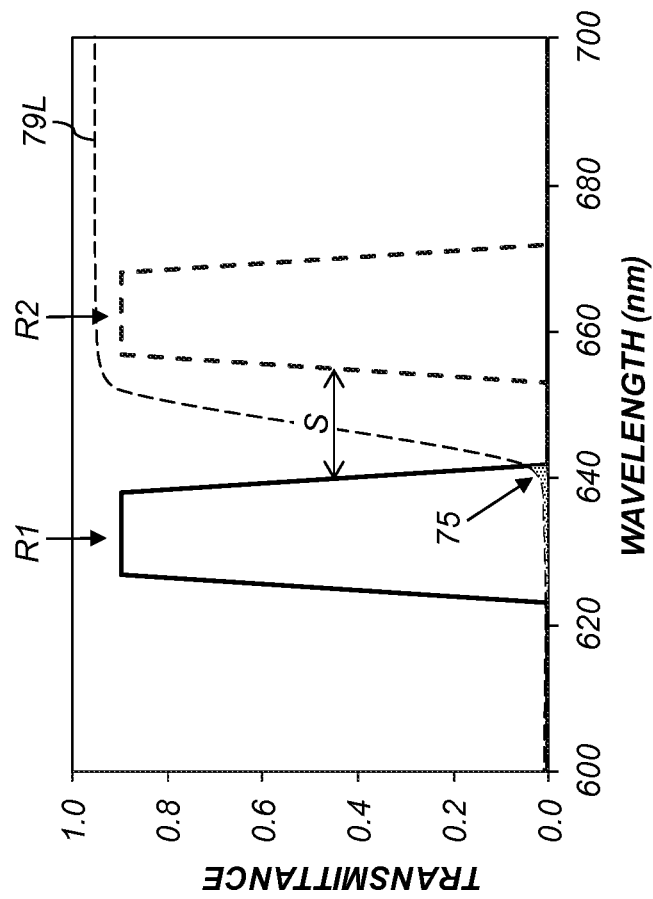
FIG. 13 is a graph illustrating the origin of crosstalk in a wavelength-based stereoscopic imaging system.

FIG. 13 illustrates the origin of crosstalk in a wavelength-based stereoscopic imaging system. The figure shows a close up of the wavelength range that includes the right-eye red spectral band R1 and the left-eye red spectral band R2. A left-eye filter transmittance 79L is shown that transmits the majority of the light in the left-eye red spectral band R2 while blocking the majority of the light in the right-eye red spectral band R1. However, it can be seen that there is a small overlap region 75 where a small amount of the light from the right-eye red spectral band R1 is transmitted by the left-eye filter transmittance 79L. This transmitted right-eye light will reach the observer's left eye, producing crosstalk and resulting in a faint ghost image.

Various metrics can be used to characterize the amount of crosstalk. One such metric is given by the following equation:

$$C_{R \to L} = \frac{\int P_R(\lambda) T_L(\lambda) d\lambda}{\int P_L(\lambda) T_L(\lambda) d\lambda} \times 100 \quad (1A)$$

$$C_{L \to R} = \frac{\int P_L(\lambda) T_R(\lambda) d\lambda}{\int P_R(\lambda) T_R(\lambda) d\lambda} \times 100 \quad (1B)$$

where $C_{R \to L}$ is the amount of crosstalk from the right-eye image that contaminates the left-eye image, $C_{L \to R}$ is the amount of crosstalk from the left-eye image that contaminates the right-eye image, $P_L(\lambda)$ and $P_R(\lambda)$ are the spectral power distributions for the light from the left-eye light emitters 12L and the right-eye light emitters 12R, respectively, $T_L(\lambda)$ and $T_R(\lambda)$ are the spectral transmittances for the left-eye filter 76L and the right-eye filter 76R, respectively, and $\lambda$ is the wavelength. It can be seen that the metrics given by Eqs. (1A) and (1B) compute the percentages of the undesired light that is passed by the filters relative to the amount of desired light that is passed by the filters. Generally, the amount of crosstalk should be less than 5% under all viewing conditions to avoid objectionable artifacts, and preferably it should be less than 2% to ensure that the crosstalk is substantially imperceptible.

A number of factors influence the level of crosstalk that occurs in the stereoscopic digital projection system 110 (FIG. 2). These factors include the amount of wavelength separation between the left-eye spectral bands and the right-eye spectral bands, the sharpness of the edge transitions for the light-emitter spectral bands, the sharpness of the edge transitions for the filter transmission bands, and the alignment between the light-emitter spectral bands and the filter transmission bands. Since the locations of the edge transitions for the filter transmission bands is sometimes a function of the incidence angle (e.g., for dichroic filters), the amount of crosstalk may be a function of viewing angle.

The wavelength separation between the left-eye spectral bands and the right-eye spectral bands is a particularly important factor that must be considered during the design of a digital projection system in order to avoid crosstalk. The wavelength separation can be defined to be the wavelength interval between the upper edge (i.e., the "cut-off edge") of the lower spectral band to the lower edge (i.e., the "cut-on edge") of the higher spectral band. This distance is characteristically measured from the half-maximum point on each band edge. For example, FIG. 13 shows the wavelength separation S between the right-eye red spectral band R1 and the left-eye red spectral band R2. The amount of wavelength separation that is necessary to eliminate objectionable crosstalk will depend on the sharpness of the edge transitions in the filter transmittance, as well as other effects such as variability of the edge transition location with incidence angle.

Figure 14:
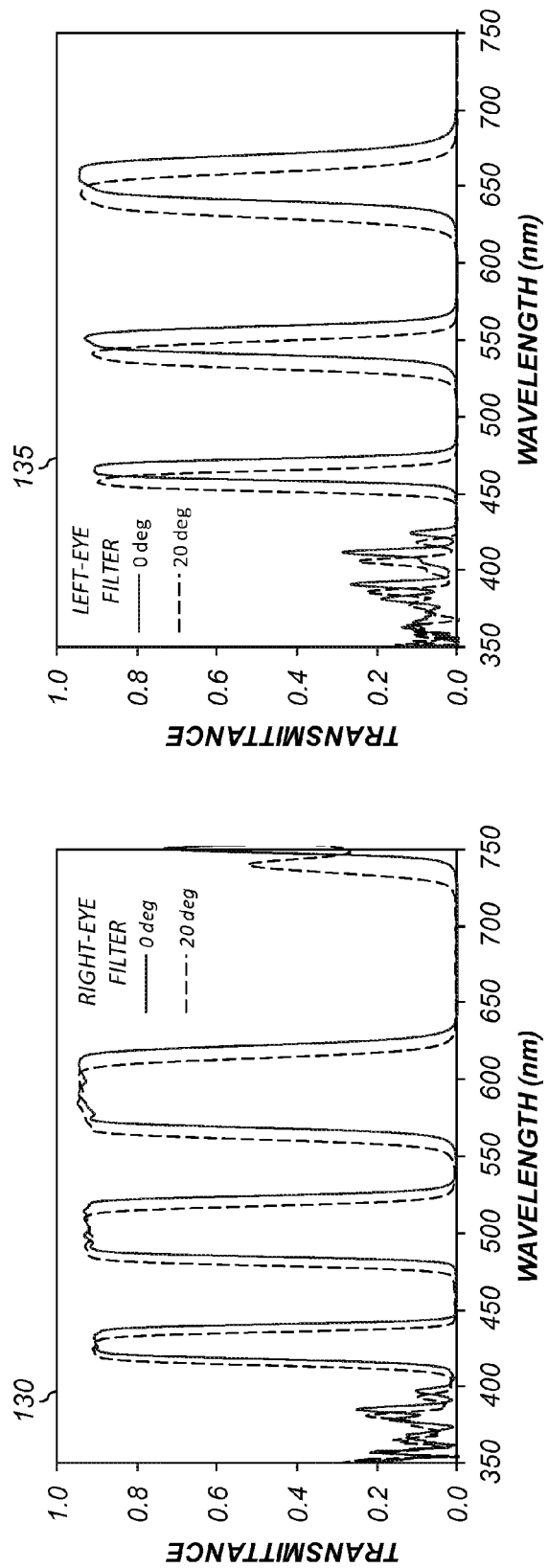
FIG. 14 is a graph illustrating the angular dependent of the spectral transmission characteristics for left-eye and right-eye eye filters used in commercially available filter glasses.

The variation of the locations of the edge transitions with angle of incidence for a set of commercially available filters intended for use with wavelength-based stereoscopic imaging systems is illustrated in FIG. 14. Graph 130 shows a pair of measured spectral transmittance curves for a right-eye filter for normally incident light as well as light incident at a 20° angle of incidence. It can be seen that the edge transitions shift about 5-10 nm toward the short wavelength direction. These wavelength shifts occur as a result of the longer path length that the light takes through the dichroic filter stack. Since the shifts occur towards the short wavelength direction, they are sometimes called "blue shifts." Graph 135 shows an analogous pair of spectral transmittance curves for a left-eye filter, which exhibit similar shifts in the edge transitions.

Because of the variability in the locations of the edge transitions, it is generally desirable that the wavelength separation between the left-eye spectral bands and the right-eye spectral bands be large enough to accommodate the range of edge transition positions associated with the range of expected viewing angles without inducing objectionable crosstalk artifacts. U.S. Patent Application Publication No. 2010/0060857, entitled "System for 3D Image Projection Systems and Viewing," to Richards et al. notes this problem and recommends sizing "guard bands" or notches between the respective spectral bands for each eye, such as between the green color channel spectral bands G1 and G2, for example.

In a preferred embodiment, the light emitters are narrow-band light sources, such as solid-state lasers, having bandwidths that are no more than about 15 nm. Accordingly, if the central wavelengths of each spectral band for a particular color are chosen to be at least 25 nm apart, this will provide wavelength separations between the bands of at least 10-15 nm, which is sufficient to provide substantial protection against crosstalk given properly designed filters. For this and other reasons, the use of narrow-band solid state light sources is advantaged over conventional approaches that use filtered white light sources, wherein the bandwidths of the spectral bands typically exceed 40 nm for individual primary colors. (The larger bandwidth is necessary in conventional filtered white light sources as further narrowing of the spectrum reduces the system optical efficiency.)

The left-eye filter 76L and the right-eye filter 76R can be made using any spectral filter technology known in the art. One type of spectral filters of particular interest for wavelength-based stereoscopic imaging systems are dichroic filters made using thin-film dichroic filter stacks. Dichroic filters are fabricated by coating a plurality of transparent thin film layers having markedly different refractive indices on a substrate. The thin film layers can be deposited in various forms and using various methods, including vacuum coating and ion-deposition, for example. The material is deposited in alternating layers having thicknesses on the order of one-quarter wavelength of the incident light in the range for which the coating is designed. Materials used for the coating layers can include dielectrics, metals, metallic and non-metallic oxides, transparent polymeric materials, or combinations thereof. In an alternate embodiment, one or more of the dichroic filter stack layers is deposited as a solution of nanoparticles. Where polymer materials are used, one or more of the filter stack layers can be formed from extruded materials.

The thicknesses and indices of refraction of the thin film layers in the dichroic filter stack can be adjusted to control the spectral transmittance characteristics. One important advantage of using filters made using dichroic filter stacks is that given enough layers, the shape of the spectral transmittance curves can be accurately controlled, and very sharp edge transitions can be achieved. This enables filters to be provided that selectively transmit one set of spectral bands while blocking the other set.

Figure 15A:
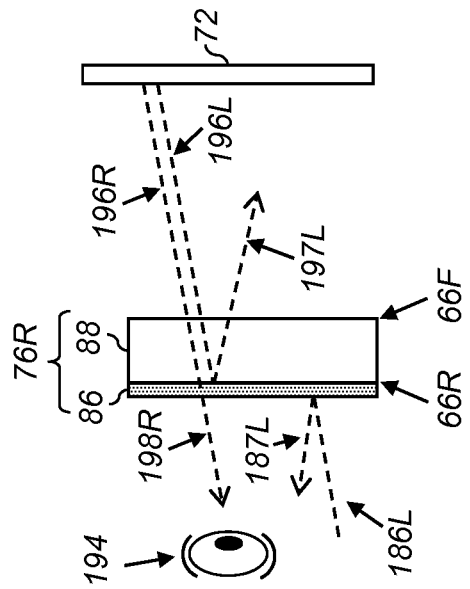
FIGS. 15A and 15B are cross-section diagrams showing embodiments of right-eye filters having a dichroic filter stack.

However, one characteristic of dichroic filters that can be disadvantageous for stereoscopic imaging application is that the light that is not transmitted through the filter is reflected back off the filter. The undesirable effects of this effect is illustrated in FIG. 15A. Imaging light from display surface 72 is directed toward an observer wearing filter glasses 74 (not shown in FIG. 15A) that include right-eye filter 76R disposed in front of the right eye 194 of the observer. The right-eye filter 76R in this case includes a dichroic filter stack 86 on a front surface 66F of a transparent substrate 88, such as a glass or plastic substrate. (The front surface 66F faces the display surface 72, while the opposite rear surface 66R faces the observer.)

The incident light includes right-eye incident light 196R comprising right-eye image data and left-eye incident light 196L comprising left-eye image data. The right-eye incident light 196R is substantially transmitted through the right-eye filter 76R as right-eye transmitted light 198R and will be incident on the observer's right eye 194 to enable the observer to view the right-eye image. The left-eye incident light 196L is substantially reflected back into the viewing environment as left-eye reflected light 197L. This reflected light can be scattered around in the viewing environment and can contaminate the viewed image as "flare" light that would be transmitted through the left-eye filter 76L (FIG. 5) into the observer's left eye. The problem of flare light is exacerbated as the audience size increases. The reflected light from each pair of filter glasses 74 can be inadvertently directed back toward the display screen or to other objects or structures in the viewing area, increasing the amount of visual noise and reducing image contrast.

Some of the left-eye flare light from a direction behind the observer may be incident on rear surface 66R of the right-eye filter 76R. This light is shown as left-eye incident light 186L, which will be substantially reflected from the dichroic filter stack and will be directed back into the right eye 194 as left-eye reflected light 187L. The origin of this light may be direct reflections off the filter glasses 74 worn by other viewers that are seated behind the observer, or may be light that may have been reflected off of other surfaces.

The left-eye filter 76L, which is not shown in FIG. 15A, has a similar structure and complementary behavior, substantially transmitting the intended image-bearing light emitted for the left-eye image while substantially blocking the unwanted light for the right-eye image.

Figure 15B:
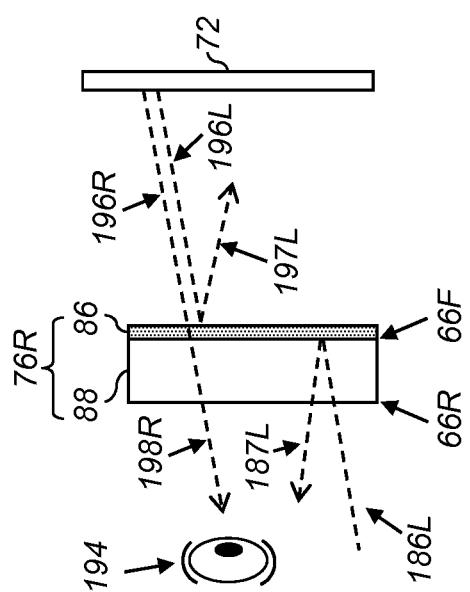

FIG. 15B shows an arrangement similar to that shown in FIG. 15A where the dichroic filter stack is on the rear surface 66R of the substrate 88. The overall behavior of the right-eye filter 76R is identical to that of FIG. 15A, although this configuration has the advantage that the dichroic filter stack 86 may be less likely to be damaged by scratching it since it is less exposed.

Figure 16A:
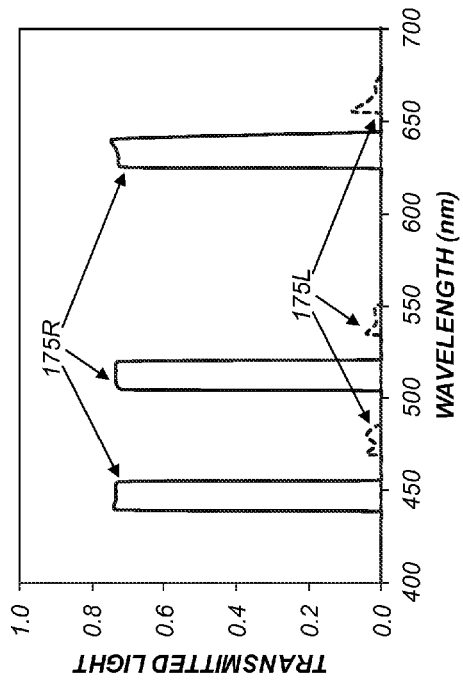
FIG. 16A is a graph showing spectral transmittance characteristics for an example right-eye filter using a dichroic filter stack.

To further illustrate the problem of unwanted reflected light, FIG. 16A shows a typical right-eye dichroic filter transmittance 170R that can be used with a wavelength-based stereoscopic projection system that uses right-eye light emitters having right-eye spectral bands R1, G1 and B1 and left-eye light emitters having left-eye spectral bands R2, G2 and B2. It can be seen that dichroic filter transmittance 170R is arranged to transmit most of the light in the right-eye spectral bands R1, G1, B1, while blocking most of the light in the left-eye spectral bands R2, G2, B2.

Figure 16B:
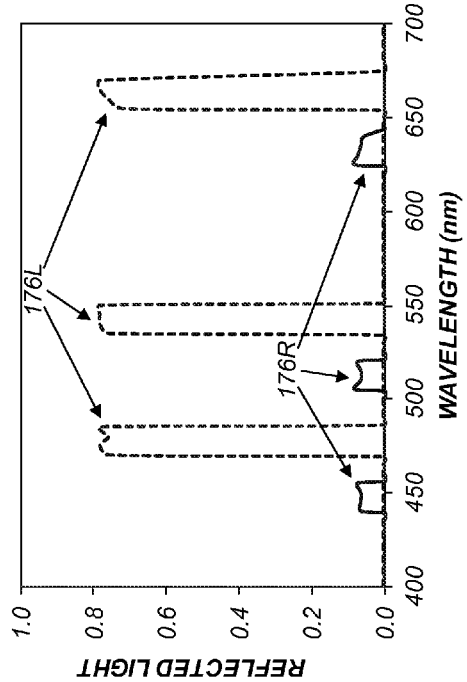
FIG. 16B is a graph showing transmitted light provided by the right-eye filter of FIG. 16A.

FIG. 16B is a graph showing the light that is transmitted through the right-eye filter 76R according to the right-eye dichroic filter transmittance 170R as a function of wavelength. In this example, the transmitted right-eye light 175R includes more than 90% of the incident light in the right-eye bands, and the transmitted left-eye light 175L includes about 3% of the light in the left-eye spectral bands. As discussed earlier, the transmitted left-eye light 175L will be a source of crosstalk in the viewed stereoscopic image.

Figure 16C:
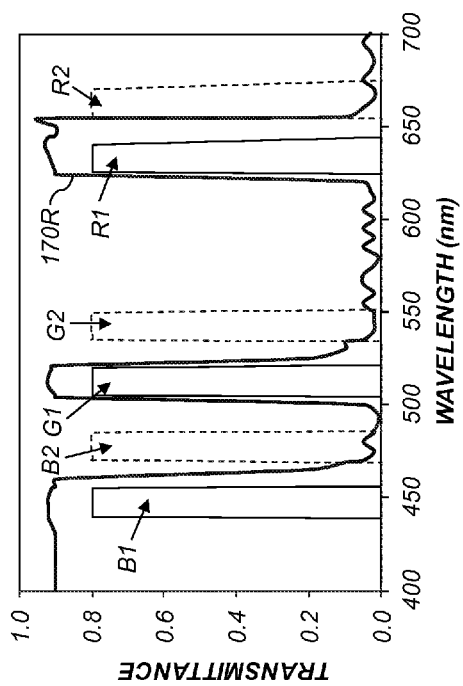
FIG. 16C is a graph showing spectral reflectance characteristics for the right-eye filter of FIG. 16A.

For dichroic filters, the dichroic filter reflectance $R_D(\lambda)$ will be approximately equal to:

$$R_D(\lambda) \approx (1 - T_D(\lambda)) \quad (2)$$

where $T_D(\lambda)$ is the dichroic filter transmittance. FIG. 16C shows a right-eye dichroic filter reflectance 171R corresponding to the right-eye dichroic filter transmittance of FIG. 16A. It can be seen that the right-eye dichroic filter reflectance 171R reflects the majority of the light in the left-eye spectral bands R2, G2, B2.

Figure 16D:
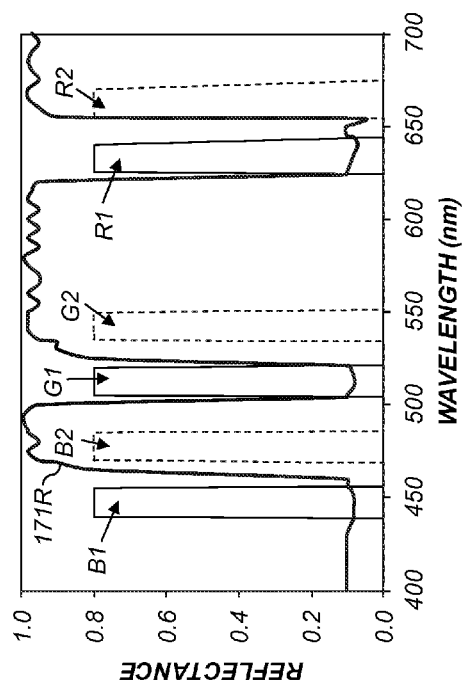
FIG. 16D is a graph showing reflected light provided by the right-eye filter of FIG. 16A.

FIG. 16D is a graph showing the light that is reflected from the right-eye filter 76R according to the right-eye dichroic filter transmittance 170R as a function of wavelength. In this example, the reflected right-eye light 176R includes less than 10% of the incident light in the right-eye bands, and the reflected left-eye light 176L includes about 97% of the light in the left-eye spectral bands. As discussed earlier, this reflected light can be a source of objectionable flare in the viewing environment.

Figure 17B:
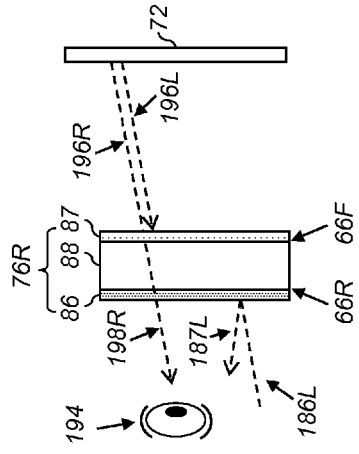
FIGS. 17A-17D are cross-section diagrams showing embodiments of right-eye filters having a dichroic filter stack and one or more absorptive filter layers.
Figure 17D:
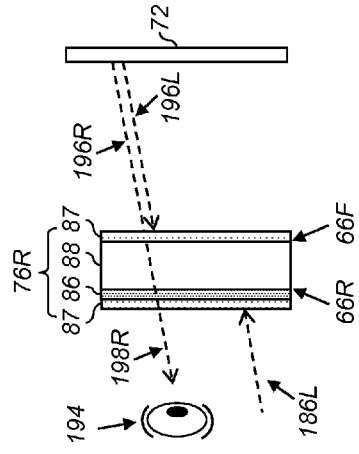
Figure 17A:
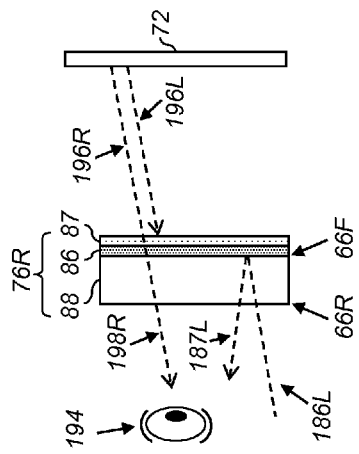

In some embodiments, the problem of unwanted reflected light is mitigated using a hybrid filter design as shown in FIG. 17A. With this approach, the right-eye filter 76R includes both a dichroic filter stack 86, as well at least one wavelength-variable absorptive filter layer 87. Absorptive filters absorb a fraction of the light at a particular wavelength, while transmitting the remainder of the light. (Some small fraction of the light may also be reflected.) It is generally not possible to produce absorptive filters having spectral transmittance characteristics with sharp edge transitions at arbitrary wavelengths as can be done with dichroic filter designs. Therefore, absorptive filters are typically not suitable to provide the high degree of color separation required for wavelength-based stereoscopic imaging system. However, the combination of absorptive filter layers with dichroic filter layers has been found to provide significant performance advantages relative to the use of pure dichroic filters.

In accordance with embodiments of the present invention, the dichroic filter stack is designed to transmit 60% or more of the light from the right-eye light emitters and reflect 60% or more of the light from the left-eye light emitters. Preferably, the dichroic filter stack should transmit at least 90% or more of the light from the right-eye light emitters and reflect at least 90% of the light from the left-eye light emitters.

Likewise, the absorptive filter layers 87 are designed to transmit a larger percentage of the light in the right-eye spectral bands that the light in the left-eye spectral bands. Preferably, the absorptive filter layers 87 should transmit a large majority of the light in the right-eye spectral bands, while absorbing a large majority of the light in the right-eye spectral bands.

Taken together, the hybrid right-eye filter is adapted to transmit 50% or more of the light from the right-eye light emitters, while blocking most of the light in the left-eye light emitters so that the amount of transmitted light from the left-eye light emitters is less than 5% of the transmitted light from the right-eye light emitters. The absorption characteristics of the absorptive filter layers 87 are such that the amount of left-eye incident light 196L reflected from the right-eye filter 76R is substantially reduced relative to configurations that use only a dichroic filter stack 86 (e.g., the configurations shown in FIGS. 15A-15B). In a preferred embodiment, the right-eye filter 76R should absorb a majority of the left-eye incident light 196L such that less than 50% of the left-eye incident light 196L is reflected. Ideally, the right-eye filter 76R should absorb a large majority (e.g., more than 90%) of the left-eye incident light 196L.

In some embodiments, the absorptive filter layers 87 can be coated on top of the dichroic filter stack 86. In other embodiments, the absorptive filter layers 87 can be provided by doping the thin film layers or substrate.

Wavelength-variable absorptive materials that are useful for providing absorptive filter layers 87 include relatively narrow-band absorbing dyes and pigments, such as ABS 647 and ABS 658 available from Exciton of Dayton, Ohio; Filtron A Series dye absorbers and Contrast Enhancement notch absorbers available from Gentex Corp. of Simpson, Pa., or other molecular chemistries.

Other classes of wavelength-variable absorptive materials that can be used in accordance with the present invention include metamaterials or resonant plasmonic structures. Metamaterials are structurally shaped nano-structures that can be tuned to absorb light, An example of such a material is described by Padilla in the article entitled "New metamaterial proves to be a 'perfect' absorber of light" (Science Daily, May 29, 2008). Similarly, plasmonic absorbers have been created by use of typically reflective metals structured at sub-wavelength scales such those described by Aydin et al. in the article "Broadband polarization-independent resonant light absorption using ultrathin plasmonic super absorbers" (Nature Communications, pp. 1-7, Nov. 1, 2011).

Still other absorber structures can be utilized such as photonic crystals where photonic crystals are utilized to guide light through multiple passes through absorption materials. For example, Zhou et al. describe absorption enhancements using photonic crystals in the article "Photonic crystal enhanced light-trapping in thin film solar cells" (Journal of Applied Physics, Vol. 103, paper 093102, 2008).

Still another approach to spectral filtration uses naturally derived nanoparticle absorbers such as colored films created by dipping a substrate in a solution of viruses or protein molecules. In some embodiments, the virus or protein molecules can be self-assembling. One example of absorbers using nonparticle virus molecules has been developed by Seung-Wak Lee at University of California, Berkeley and is described in an article entitled "No paint needed! Virus patterns produce dazzling colour" (New Scientist, p. 18, Oct. 29, 2011).

In some embodiments, a plurality of absorptive filter layers 87 can be used. For example, individual absorptive filter layers 87 can be provided for to selectively absorb light in each of the spectral bands R2, G2, B2 that comprise the left-eye incident light 196L. Alternately, a single absorptive filter layer 87 can be used to selectively absorb light in portions of a plurality of the spectral bands R2, G2, B2.

In the configuration of FIG. 17A, the dichroic filter stack 86 is positioned over the front surface 66F of the substrate 88, and the absorptive filter layer 87 is positioned over the dichroic filter stack 86. In order to achieve the stated advantages the absorptive filter layer 87 must be positioned between the light source (e.g., the display surface 72) and the dichroic filter stack 86 so that the unwanted light is absorbed before it can be reflected by the dichroic filter stack 86. As illustrated in FIG. 17B, the absorptive filter layer 87 and the dichroic filter stack 86 can alternatively be positioned in other arrangements as long as they maintain the proper relative positions. In this example, the dichroic filter stack 86 is positioned over the rear surface 66R while the absorptive filter layer 87 is positioned over the front surface 66F.

The arrangements of FIGS. 17A and 17B will be ineffective to prevent the reflection of left-eye incident light 186L that is incident on the rear surface 66R of the right-eye filter 76R (e.g., after reflecting off of filter glasses worn by other viewers). This light will interact with the dichroic filter stack 86 before it reaches the absorptive filter layer 87, and will therefore still be reflected as left-eye reflected light 187L.

Figure 17C:
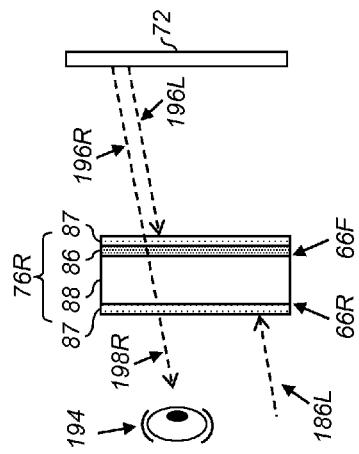

FIGS. 17C and 17D show arrangements that are analogous to FIGS. 17A and 17B, respectively, where a second absorptive filter layer 86 is positioned over the rear surface 66R. In this way, both the left-eye incident light 196L and the left-eye incident light 186L will be substantially absorbed, although at the cost of a slightly lower transmittance for the right-eye incident light 196R. In such embodiments, the right-eye filter 76R should preferably absorb a majority of the left-eye incident light 186L such that less than 50% of the left-eye incident light 186L is reflected. Ideally, the right-eye filter 76R should absorb a large majority (e.g., more than 90%) of the left-eye incident light 186L.

In other embodiments, the layers can be distributed in other arrangements, or can be combined with additional layers. For example, additional protective layers can be positioned over one or both of the dichroic filter stack 86 or the absorptive filter layer 87 to provide scratch resistance or fade resistance. An anti-reflection coating can also be used to reduce first-surface reflections. In some embodiments, the anti-reflection coating can be formed with a plurality of thin film layers, which can optionally be included as part of the dichroic filter stack 86.

Figure 18:
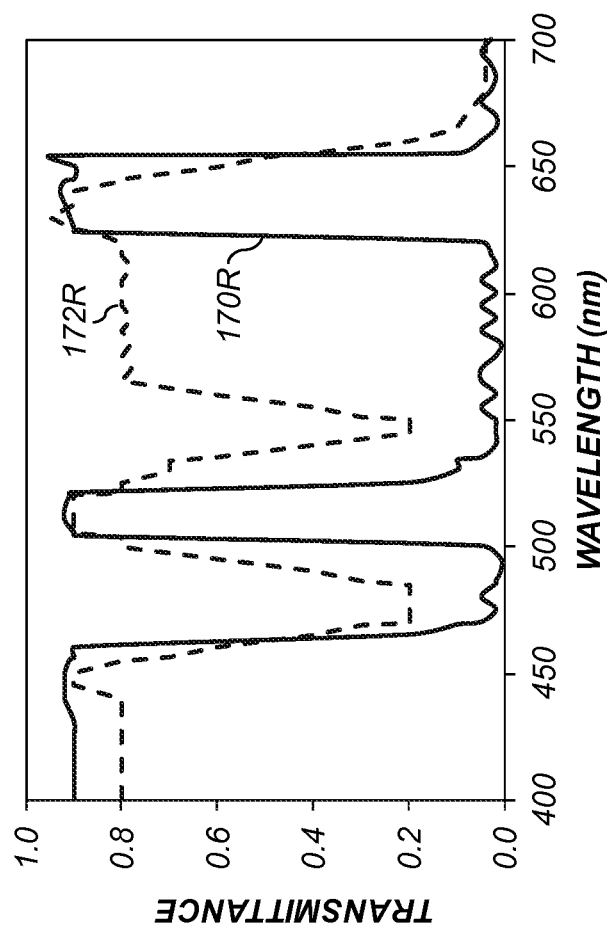
FIG. 18 is a graph showing spectral transmittance characteristics for an example dichroic filter stack and an example absorptive filter layer appropriate for use in a right-eye filter.

FIG. 18 shows an example of a right-eye absorptive filter transmittance 172R that can be used for the absorptive filter layer 87 (FIG. 17A), in combination with the right-eye dichroic filter transmittance 170R of FIG. 16A. If a dichroic filter stack 86 and an absorptive filter layer 87 with these spectral properties are used in the hybrid filter arrangement of FIG. 17A or 17B, the combined transmittance of the hybrid filter $T_H(\lambda)$ can be calculated as follows:

$$T_H(\lambda) \approx T_D(\lambda) T_A(\lambda) \qquad (3)$$

where $T_D(\lambda)$ is the dichroic filter transmittance and $T_A(\lambda)$ is the absorptive filter transmittance. (This assumes that the substrate transmittance is approximately equal to 1.0.) The combined reflectance of the hybrid filter $R_H(\lambda)$ can be calculated as follows:

$$R_H(\lambda) \approx R_D(\lambda)(T_A(\lambda))^2 = (1 - T_D(\lambda))(T_A(\lambda))^2 \qquad (4)$$

where $R_D(\lambda)$ is the dichroic filter reflectance, which is equal to $1 - T_D(\lambda)$ by Eq. (2). This equation is based on the assumption that the reflected light is transmitted through the absorptive filter layer 87, reflected by the dichroic filter stack 86, and then transmitted through the absorptive filter layer 87 a second time. It makes the assumption that first surface reflectances can be neglected.

FIG. 19A shows a right-eye hybrid filter transmittance 173R calculated from the spectral transmittances in FIG. 18 using Eq. (3). The right-eye hybrid filter transmittance 173R is superimposed on a set of right-eye spectral bands R1, G1 and B1 and a set of left-eye spectral bands R2, G2 and B2. Comparing FIG. 19A to FIG. 16A, it can be seen that the right-eye hybrid filter transmittance 173R is quite similar to the right-eye dichroic filter transmittance 170R.

FIG. 19B is a graph showing the light that is transmitted through the right-eye filter 76R according to the right-eye hybrid filter transmittance 173R as a function of wavelength. In this example, the transmitted right-eye light 175R includes about 81% of the incident light in the right-eye bands, which is a slight degradation relative to the dichroic-only configuration that was plotted in FIG. 16B. However, the transmitted left-eye light 175L includes only about 1% of the light in the left-eye spectral bands. This represents about a 3× reduction in the amount of cross-talk relative to the dichroic-only configuration. This reduction in cross-talk is an added benefit of the hybrid filter approach.

FIG. 19C shows a right-eye hybrid filter reflectance 174R calculated using Eq. (4). In comparison to FIG. 16C, it can be seen that the reflectivity in the wavelength regions corresponding to the left-eye spectral bands R2, G2, B2 is significantly reduced.

FIG. 19D is a graph showing the light that is reflected from the right-eye filter 76R according to the right-eye hybrid filter reflectance 174R as a function of wavelength. In this example, the reflected right-eye light 176R includes less than 7% of the incident light in the right-eye bands, and the reflected left-eye light 176L includes about 8% of the light in the left-eye spectral bands. This represents more than a 12× reduction in the amount of reflected left-eye light relative to the dichroic-only solution. This will provide a significant reduction in the amount of flare light that results from reflections off the filter glasses 74.

It should be noted that absorptive filter layers 87 can be used to supplement the spectral separation provided by dichroic filter stacks 86 to form hybrid filters whether the stereoscopic imaging system uses interleaved spectral bands (as in the examples discussed relative to FIG. 12A and FIGS. 19A-19D) or non-interleaved spectral bands (such as the configuration shown in FIG. 12B). A general design principle is that the absorptive filter layers 87 used with the filter for a particular eye should absorb more of the spectral bands associated with the opposite eye image and less of the spectral bands associated with the image-forming light for the particular eye.

Figure 20A:
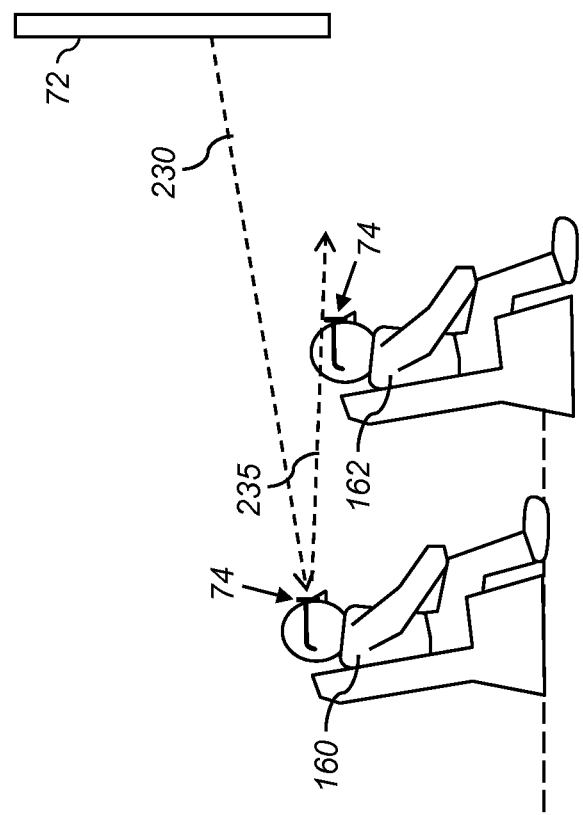
FIG. 20A is a schematic diagram showing a path of light reflected light from filter glasses for two observers having heads at the same height.
Figure 20B:
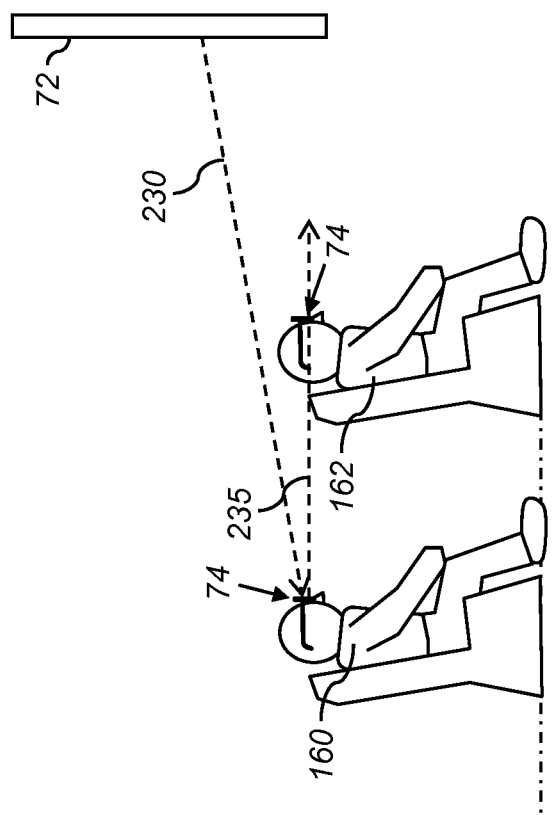
FIG. 20B is a schematic diagram showing a path of light reflected light from filter glasses for two observers having heads at different heights.

As has been noted, reflection of "flare light" that is reflected from filter glasses 74 worn by other viewers can reduce the contrast of the projected image seen by an observer and can add visual noise that detracts from the stereoscopic viewing experience. To illustrate this, FIGS. 20A and 20B illustrate a scenario where some incoming light 230 from display surface 72 is reflected from filter glasses 74 worn by a rear observer 160 and is directed as reflected light 235 onto the rear side of filter glasses 74 worn by a front observer 162. As was discussed relative to FIGS. 15A and 15B, some of this light can be reflected back into the eyes of front observer 162. This effect can be more or less pronounced, depending on whether or not the heads of rear observer 160 and front observer 162 are at the same height as shown in FIG. 20A, or at different heights as shown in FIG. 20B. With typical seating arrangements, the head of front observer 162 is at a lower elevation than that of the rear observer 160 as shown in the FIG. 20B configuration. In the worst case scenario, the filter glasses 74 use dichroic filters that reflect most or all of the light from the spectral bands that are not transmitted to the eyes of the rear observer 160. When front observer 162 is directly in front and relatively level with rear observer 160, those functionally identical filter glasses 74 on front observer 162 will now highly reflect the wrong spectral content from any light that happens to strike the back surface of the filters, substantially degrading stereoscopic image quality and contrast. Even when the reflected light of filter glasses 74 does not directly land on the back side of the filter glasses 74 for the front observer 162, some of that light will return to the projection screen further decreasing image quality and contrast for all viewers. While curved filters spreads this light out more than flat filters, much of the light will still land on the screen.

FIGS. 21A and 21B illustrate filter glasses 200 having a modified design to mitigate the degradation of image quality due to light reflected from the right-eye filter 76R and the left-eye filter 76L according to an embodiment of the present invention. The side view of FIG. 21A and perspective view of FIG. 21B show filter glasses 200 that are configured to reduce image degradation due to back reflection by redirecting reflected light at a skewed angle, upwards with respect to the viewer position, so that it is directed away from the display surface 72 (FIG. 20A) other viewers sitting in front of the wearer of the filter glasses 200. A frame 210 including rims 215 dispose the right-eye filter 76R and the left-eye filter 76L at a tilt angle θ relative to vertical, so that reflected light is directed upwards and away from other viewers seated ahead of the wearer of the filter glasses 200.

For typical viewing environments, the tilt angle θ is preferably between about 5 to 20 degrees. A larger tilt angle may be preferred for embodiments where there is a very short distance between the wearer of the filter glasses 200 and the display surface 72. An extreme example would be an observer sitting approximately one screen height away from the display surface at a vertical position approximately ¼ of a screen height from the bottom. In this case, light from the bottom of the display surface 72 reaches the filter glasses 200 from a direction about 14 degrees below the horizontal and light from the top of the display surface 72 reaches the filter glasses from a direction about 37 degrees above the horizontal. Thus the filters would need to be tipped up to a tilt angle of approximately 37 degrees in order for all of reflected light to be directed over the top of the display surface 72. This level of angular tilt may not be practical from an aesthetics point of view. Most audience viewers prefer to be at center level or higher with the screen suggesting a maximum tip of 26 degree would be more practical. Significant benefits can be realized even when the tilt angle θ is less than this level since the light from all viewers returning to the screen is additive, therefore any reduction in the stray light provides a corresponding image quality improvement.

For cases where the left-eye filter 76L and the right-eye filter 76R include dichroic filter stacks, the tilting of the filters will generally cause the edge transitions in the spectral transmittance curves to shift as has been discussed earlier. In this case, it may be desirable to adjust the dichroic filter designs to provide the desired spectral transmittance characteristics.

In some embodiments, the frame 210 include optional opaque side shields 220 that block at least some of the stray light from reaching the rear surface of the left-eye filter 76L and the right-eye filter 76R. In a preferred embodiment, the rims 215 are made using a moldable material and the tilt angle θ is provided by appropriately molding the shape of the rims 215. In an alternate embodiment illustrated in FIG. 21C, the frame 210 include a hinge mechanism 225 that enables the rims 215 to be pivoted to provide a variable tilt angle θ. In this way, the tilt angle can be adjusted as appropriate for the viewing environment.

In the illustrated embodiments, the front and back surfaces of the left-eye filter 76L and the right-eye filter 76R are shown to be substantially planar and behave as flat plates. In other embodiments, the left-eye filter 76L and the right-eye filter 76R may be provided as curved plates with spherical or aspherical curved surfaces. In this case, the tilt angle is defined relative to a best fit plane through the curved surfaces.

Figure 22:
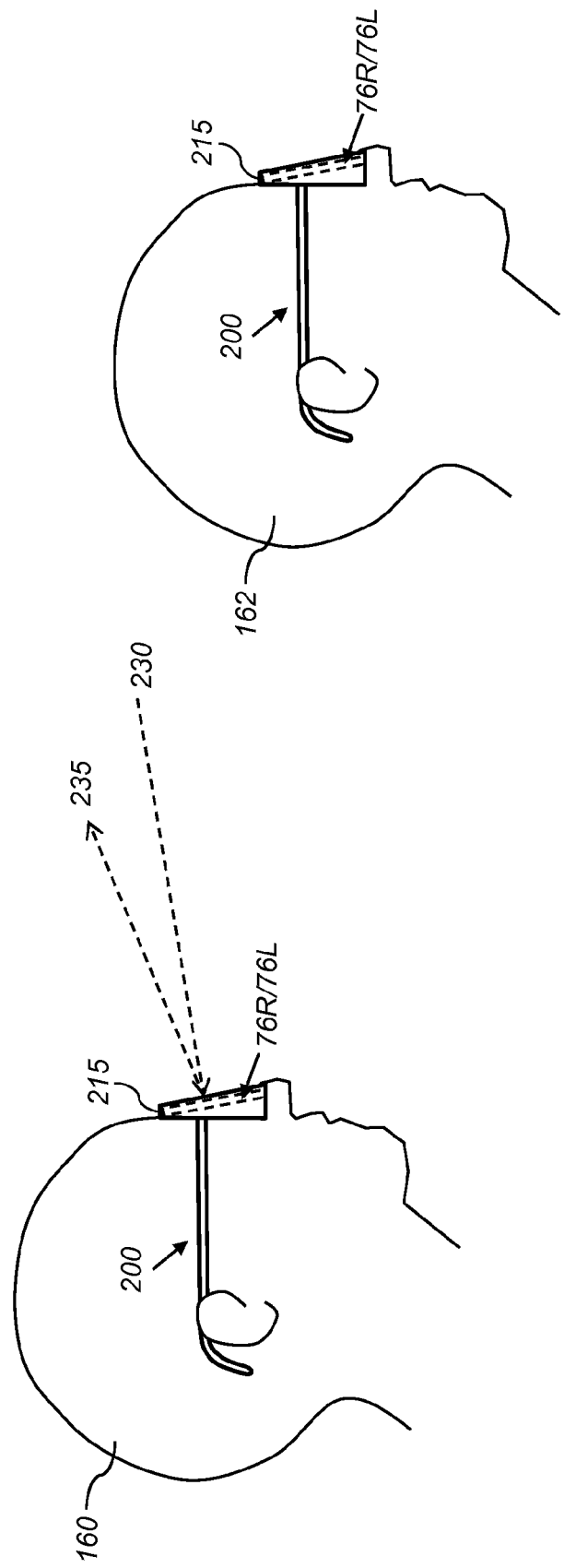
FIG. 22 is a side view that showing observers wearing filter glasses with tilted filter elements.
Figure 23:
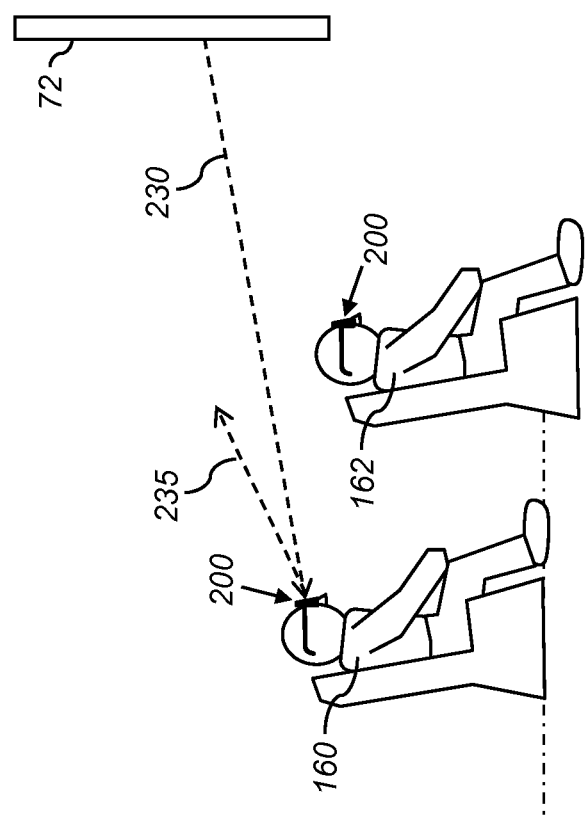
FIG. 23 is a schematic diagram showing a path of light reflected light from filter glasses with tilted filter elements for two observers having heads at different heights.

FIGS. 22 and 23 shows filter glasses 200 worn by rear observer 160 and front observer 162, according to an embodiment of the present invention. The rims 215 in the filter glasses 200 are arranged to orient the left-eye filter 76L and the right-eye filter 76R at an appropriate tilt angle so that reflected light 235 produced when incoming light 230 from the display surface 72 (not shown in FIG. 22) is reflected from the left-eye filter 76L and the right-eye filter 76R of the filter glasses 200 worn by the rear observer 160 is directed over the heads of other observers (e.g., front observer 162). As a result, the reflected light 235 from the filter glasses 200 for the rear observer 160 is less likely to negatively impact the image quality seen by the front observer 162. Preferably, the reflected light 235 is directed over the top of the display surface 72 so that it does not add flare light to the displayed image.

Figure 24:
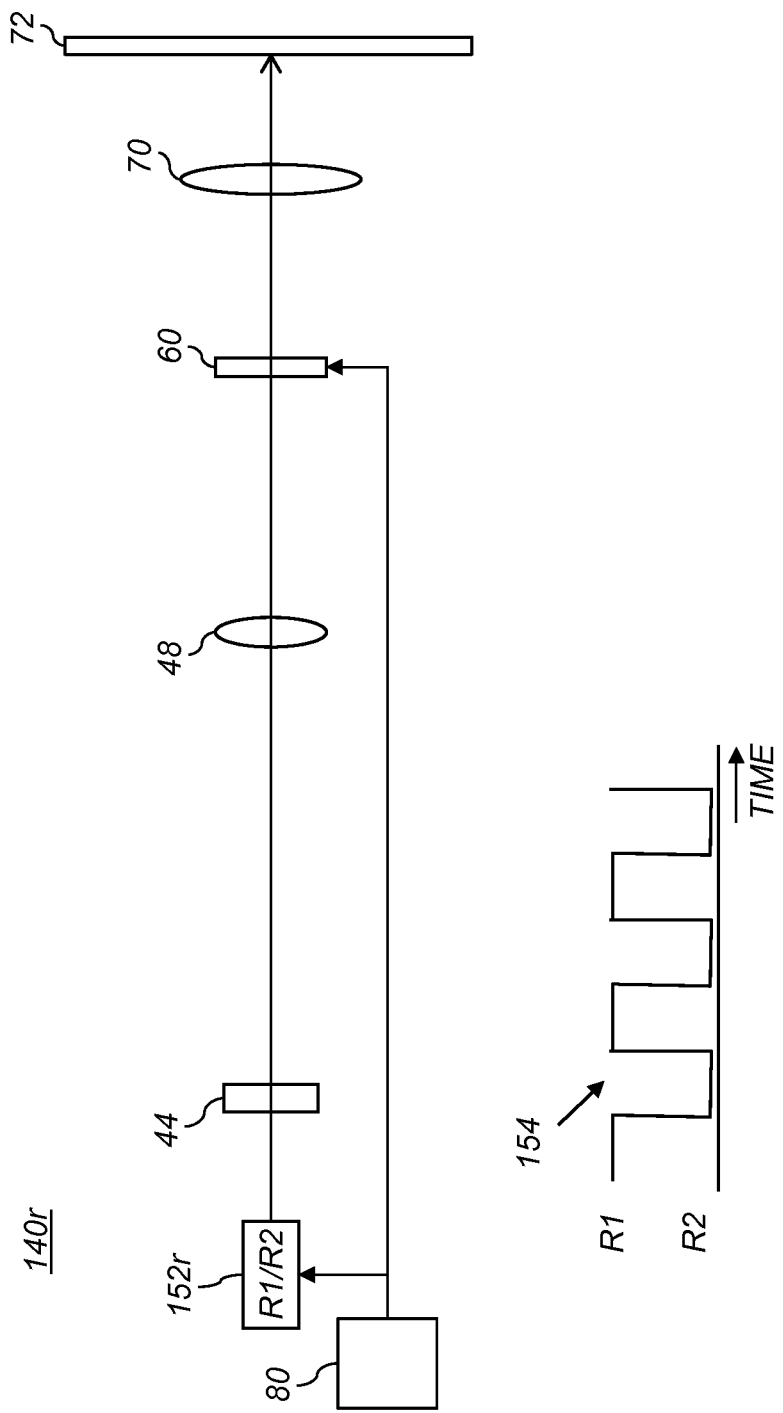
FIG. 24 is a schematic diagram showing one color channel of a stereoscopic imaging system for forming right-eye and left-eye images using tunable light emitters.

In an alternate embodiment of the present invention, there is provided a stereoscopic imaging apparatus that uses one or more tunable light sources to provide the different spectral bands in at least one of the color channels. Referring to FIG. 24, there is shown a schematic diagram of a red imaging channel 140r that has a red tunable light emitter 152r, such as a tunable narrow-band, solid-state laser, for example. The red tunable light emitter 152r can selectively provide light in at least two different states. In the first state, the red tunable light emitter 152r provides light in the R1 spectral band that is used to form the right-eye image, and in the second state the red tunable light emitter 152r provides light in the R2 spectral bands that is used to form the left-eye image. As shown in timing chart 154, the controller system 80 is adapted to control the red tunable light emitter 152r so that it alternately emits light in the R1 and R2 spectral bands according to a defined temporal sequence. In order to switch without being detectable to the viewer, the red tunable light emitter 152r must be capable of switching between the color states at a high rate, such as at about 60 Hz, for example.

The emitted light is conditioned by optical components (e.g. uniformizing optics 44 and one or more lenses 48) to illuminate spatial light modulator 60. The pixels of spatial light modulator 60 are synchronously controlled by the controller system 80 according to image data for the corresponding right-eye or left-eye image. The resulting image is then projected to display surface 72 using projection optics 70 as described previously.

Figure 25:
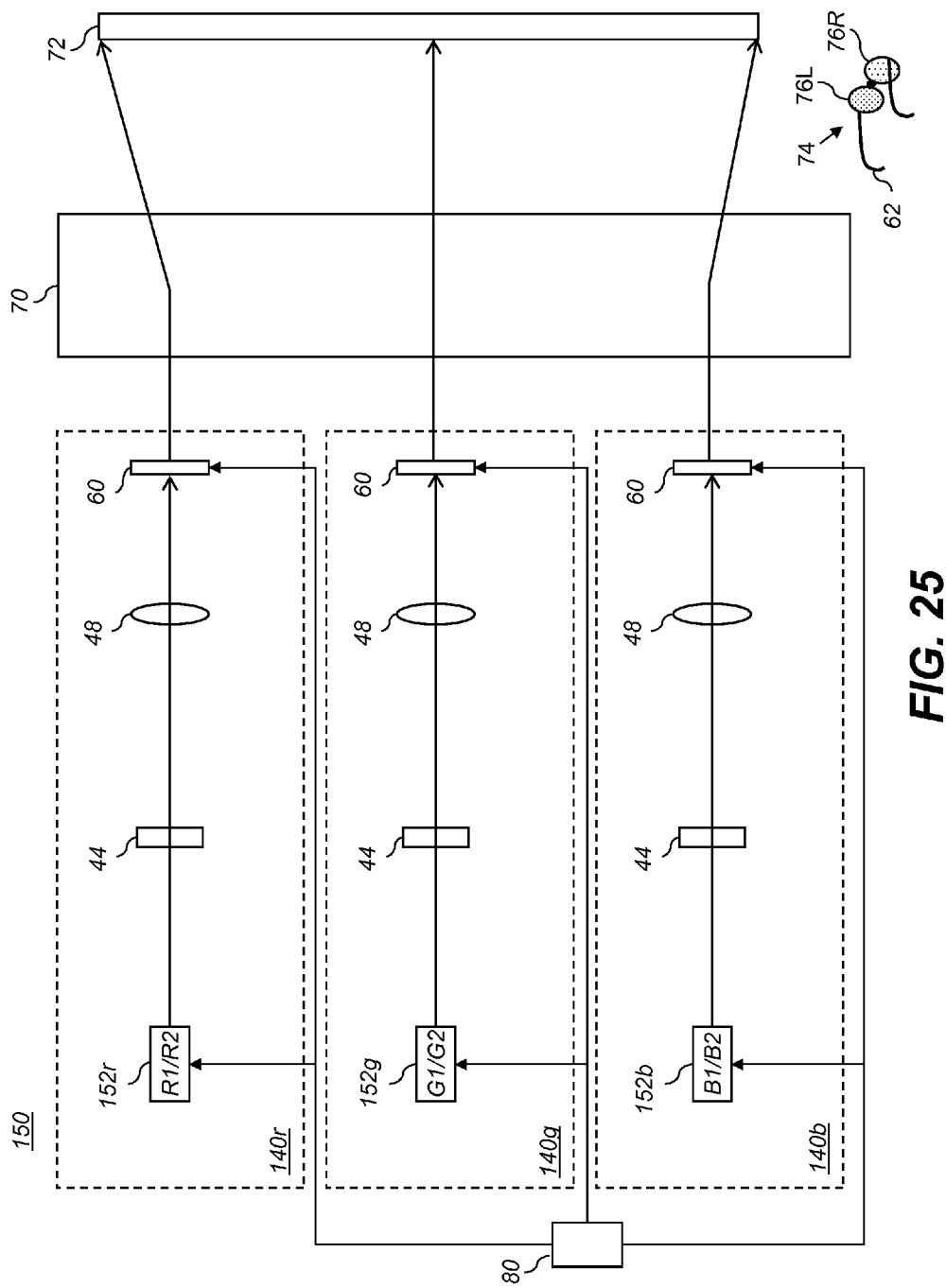
FIG. 25 is a schematic diagram showing a color stereoscopic imaging system for forming right-eye and left-eye images using tunable light emitters.

As illustrated in FIG. 25, the red tunable light emitter 152r of FIG. 24 can be combined with a green tunable light emitter 152g and a blue tunable light emitter 152b that provide right-eye and left-eye image content in the blue and green color channels, respectively, to form color stereoscopic imaging system 150, having red imaging channel 140r, green imaging channel 140g and blue imaging channel 140b. Each tunable light emitter emits light in at least two different spectral bands, typically of the same primary color (red, green, or blue). In this configuration, the projection optics 70 can include a beam combining system, such as the dichroic combiner 82 described with reference to FIG. 9, for example.

It can be appreciated that the stereoscopic imaging system 150 which uses tunable light emitters has advantages over other types of wavelength-based stereoscopic imaging systems that require multiple light sources or require multiple banks of filters for filtering light from a single polychromatic (white) light source. For example, the configuration described relative to FIG. 5, requires six different light emitters rather than the three light emitters of FIG. 25. Furthermore, the configuration of FIG. 5 also requires three beam scanners 50 to switch between the two color states.

Another useful feature of some types of tunable light emitters is that they can be used to provide some amount of wavelength "jitter" about a central wavelength either through creation of multiple simultaneous modes, high frequency mode hopping or higher frequency tuning around the central spectral band, so that the emitted light varies at each moment with respect to wavelength. In this case, when the controller system 80 controls the tunable light emitters to operate in their first state the tunable light emitters can be configured to sequentially emit light having two or more different peak wavelengths within a first spectral band, and when the tunable light emitters to operate in their second state the tunable light emitters can be configured to sequentially emit light having two or more different peak wavelengths within a second spectral band that is spectrally adjacent to the first spectral band. Randomness of the spectral output within the wavelength range of the spectral band reduces undesirable effects of highly coherent light, such as speckle, common to many types of laser projection systems.

The red, green and blue tunable light emitters 152r, 152g and 152b of FIG. 25 can be any type of tunable light source known in the art. In some embodiments, the tunable light emitters are solid-state light sources, such as tunable light-emitting diodes (LEDs) or tunable lasers. Tunable lasers change emitted output wavelength using one of a number of different possible mechanisms. One such approach involves the control of an optical cavity using micro-electromechanical systems (MEMS) devices capable of rapidly switching between mechanical states as described in the article "760 kHz OCT scanning possible with MEMS-tunable VCSEL" by Overton (Laser Focus World, p. 15, July 2011). In the described device, an electrostatically actuated dielectric mirror is suspended over the top of a laser structure in order to adjust the wavelength.

An alternate approach to providing a suitable tunable laser is to use a bistable laser. Feng et al., in an article entitled "Wavelength bistability and switching in two-section quantum-dot diode lasers" (IEEE Journal of Quantum Electronics, Vol. 46, pp. 951-958, 2010), disclose the use of two-section mode-locked quantum dot lasers that switch in discrete integer multiples in 50 picoseconds. The operation of this device is based on the interplay of the cross-saturation and self saturation properties in gain and absorber and the quantum-confined Stark effect in absorber. This type of laser can be easily tuned by varying a current injection level or a voltage level.

A type of tunable LED that can be used in accordance with the present invention is described by Hong, et al. in an article entitled "Visible-Color-Tunable Light-Emitting Diodes," Advanced Materials, Vol. 23, pp. 3284-3288 (2011). These devices are based on gallium nitride nanorods coated with layers of indium gallium nitride to form quantum wells. The thicknesses of the layers vary naturally when they are produced and, by changing the applied voltage, current can be pushed through different layers, thereby providing different colors of emitted light.

The invention has been described in detail with particular reference to certain preferred embodiments thereof, but it will be understood that variations and modifications can be effected within the spirit and scope of the invention. For example, the light emitters used in the various embodiments can be of any type known in the art, and can include arrays of lasers or other emissive devices combined onto the same optical axis using prisms or other combining optics.

Optical systems, typically represented by a lens or a block in the schematic drawings provided, could include any number of optical components needed to guide and condition the illumination or imaged light.

The spatial light modulator 60 in each color channel can be any of a number of different types of spatial light modulator, such as a liquid crystal array or a Digital Light Processor available from Texas Instruments, Dallas, Tex. (a type of digital micro-mirror array) for example.

In some embodiments, a color channel can have two spatial light modulators, one corresponding to each eye of the observer, so that there are six spatial light modulators in a stereoscopic digital projection system. Alternately, each color channel can have a single spatial light modulator as in FIG. 5, shared between left-eye and right-eye image content using color scrolling or some other resource-sharing method, such as alternately activating the different spectral bands according to a timing pattern.

In some embodiments, additional filtering can be provided in the illumination path to attenuate the spectral content from one or more of the light emitters so that the adjacent spectral bands are substantially non-overlapping.

While the invention has been described with reference to a stereoscopic digital projection system which projects images onto a display screen, it will be obvious to one skilled in the art that the invention can also be applied to other types of stereoscopic digital display systems that do not involve projection. For example, stereoscopic digital soft-copy displays can be used to directly form the left-eye and right-eye stereoscopic images on a display surface. The soft-copy display can use any type of display technology known in the art such as LED displays and LCD displays.

PARTS LIST 12 light emitter
12L left-eye light emitters
12R right-eye light emitters
18 optics
20 spatial light modulator
28a image frame
28b image frame
28c image frame
28d image frame
28e image frame
30 light redirecting prism
32 image region
34b band of light
34g band of light
34r band of light
35b band of light
35g band of light
35r band of light
36a band of light
36b band of light
38 image frame
38a image frame
38b image frame
38c image frame
38d image frame
38e image frame
40r red color channel
40g green color channel
40b blue color channel
41L left-eye image forming system
41R right-eye image forming system
42a light source
42b light source
43L light source
43R light source
44 uniformizing optics
46 beam combiner
48 lens
50 beam scanner
52 prism
54 lenslet array
56 block
58 integrating bar
60 spatial light modulator
60L spatial light modulator
60R spatial light modulator
62 frame
66F front surface
66R rear surface
68 dichroic surface
70 projection optics
72 display surface
74 filter glasses
75 overlap region
76L left-eye filter
76R right-eye filter
77B bandpass filter transmission band
77E edge filter transmission band
78L left-eye filter transmittance
78R right-eye filter transmittance
79L left-eye filter transmittance
79R right-eye filter transmittance
80 controller system
82 dichroic combiner
84 dichroic surface
86 dichroic filter stack
87 absorptive filter layer
88 substrate
90 illumination optics
92 beam scanning optics
94 first stage
96 second stage
100 stereoscopic digital projection system
110 stereoscopic digital projection system
120 projector apparatus
130 graph
135 graph
140b blue imaging channel
140g green imaging channel
140r red imaging channel
150 stereoscopic imaging system
152b blue tunable light emitter
152g green tunable light emitter
152r red tunable light emitter
154 timing chart
160 rear observer
162 front observer
170R right-eye dichroic filter transmittance
171R right-eye dichroic filter reflectance
172R right-eye absorptive filter transmittance
173R right-eye hybrid filter transmittance
174R right-eye hybrid filter reflectance
175R transmitted right-eye light
175L transmitted left-eye light
176R reflected right-eye light
176L reflected left-eye light
186L left-eye incident light 187L left-eye reflected light
194 right eye
196R right-eye incident light
196L left-eye incident light
197L left-eye reflected light
198R right-eye transmitted light
200 filter glasses
210 frame
215 rims
220 side shield
225 hinge mechanism
230 incoming light
235 reflected light
A1 area
A2 area
B spectral band
B1 spectral band
B2 spectral band
G spectral band
G1 spectral band
G2 spectral band
O axis
R spectral band
R1 spectral band
R2 spectral band
S wavelength separation
θ tilt angle
θ1 angle
θ2 angle

The invention claimed is:

1. A stereoscopic digital projection system that projects stereoscopic images including first-eye images and second-eye images onto a display surface, comprising:

narrow-band, solid-state, red, green and blue first-eye light emitters having corresponding red, green and blue first-eye spectral bands with respective red, green and blue first-eye central wavelengths, $\lambda_{R1}$, $\lambda_{G1}$ and $\lambda_{B1}$;

narrow-band, solid-state, red, green and blue second-eye light emitters having corresponding red, green and blue second-eye spectral bands with respective red, green and blue second-eye central wavelengths, $\lambda_{R2}$, $\lambda_{G2}$ and $\lambda_{B2}$, the first-eye spectral bands being substantially non-overlapping with the second-eye spectral bands, and the central wavelengths being arranged such that $\lambda_{B1} < \lambda_{B2} < \lambda_{G2} < \lambda_{G1} < \lambda_{R1} < \lambda_{R2}$;

an image forming system including at least one spatial light modulator for forming a first-eye modulated image by modulating light from the red, green and blue first-eye light emitters responsive to image data for a first-eye image and for forming a second-eye modulated image by modulating light from the red, green and blue second-eye light emitters responsive to image data for a second-eye image; and projection optics for delivering the first-eye modulated image and the second-eye modulated image to a display surface.

2. The stereoscopic digital projection system of claim 1 further including filter glasses comprising:

a first-eye filter having spectral transmission characteristics including:
a first contiguous transmission band that transmits more than 50% of the light from the blue first-eye light emitter; and
a second contiguous transmission band that transmits more than 50% of the light from both the red and green first-eye light emitters;
wherein the amount of the light from the red, green and blue second-eye light emitters that is transmitted by the first-eye filter is less than 5% of the amount of light transmitted from the corresponding red and green first-eye light emitters;

a second-eye filter having spectral transmission characteristics including:
a first contiguous transmission band that transmits more than 50% of the light from the blue and green second-eye light emitters; and
a second contiguous transmission band that transmits more than 50% of the light from the red second-eye light emitter;
wherein the amount of the light from the red, green and blue first-eye light emitters that is transmitted by the second-eye filter is less than 5% of the amount of light transmitted from the corresponding red and green second-eye light emitters; and a frame into which the first-eye filter and the second-eye filter are mounted, the frame being adapted to position the first-eye filter in front of an observer's first eye and to position the second-eye filter in front of the observer's second eye.

3. The stereoscopic digital projection system of claim 2 wherein one or both of the first transmission band for the first-eye filter and the second transmission band for the second-eye filter are edge filter transmission bands.

4. The stereoscopic digital projection system of claim 2 wherein the second transmission band for the first-eye filter and the first transmission band for the second-eye filter are bandpass filter transmission bands.

5. The stereoscopic digital projection system of claim 2 wherein one or both of the first-eye filter and the second-eye filter are formed using a plurality of filter layers that include a dichroic filter stack.

6. The stereoscopic digital projection system of claim 2 wherein one or both of the first-eye filter and the second-eye filter include one or more absorptive filter layers.

7. The stereoscopic digital projection system of claim 1 wherein the first-eye light emitters and the second-eye light emitters include solid-state lasers or LEDs.

8. The stereoscopic digital projection system of claim 1 wherein the first-eye spectral bands and the second-eye spectral bands have full-width, half-maximum bandwidths of less than 15 nm.

9. The stereoscopic digital projection system of claim 1 wherein the red, green and blue first-eye spectral bands are each separated from the corresponding second-eye spectral band by at least 15 nm.

10. The stereoscopic digital projection system of claim 1 wherein a first white balancing operation is used to white balance the first-eye image and a second white balancing operation different from the first white balancing operation is used to white balance the second-eye image, the first white balancing operation being adapted for use with emitted light in the red, green and blue first-eye spectral bands and the second white balancing operation being adapted for use with emitted light in the red, green and blue second-eye spectral bands.

11. The stereoscopic digital projection system of claim 1 wherein a first color correction transform is used to transform digital image data associated with the first-eye image and a second color correction transform different from the first color correction transform is used to transform digital image data associated with the second-eye image, the first color correction transform being adapted for use with emitted light in the red, green and blue first-eye spectral bands and the second color correction transform being adapted for use with emitted light in the red, green and blue second-eye spectral bands.

12. The stereoscopic digital projection system of claim 1 wherein the central wavelengths are peak wavelengths of the corresponding spectral bands, centroid wavelengths of the corresponding spectral bands, or average wavelengths representing an average of upper and lower edges of the corresponding spectral bands.

13. The stereoscopic digital projection system of claim 1 wherein the image forming system includes a first spatial light modulator for modulating light from the red first-eye and second-eye light emitters, a second spatial light modulator for modulating light from the green first-eye and second-eye light emitters and a third spatial light modulator for modulating light from the blue first-eye and second-eye light emitters.

14. The stereoscopic digital projection system of claim 13 wherein a scrolling system is used to scroll bands of light from the first-eye and second eye light emitters across the respective spatial light modulator.

15. The stereoscopic digital projection system of claim 13 wherein the first-eye and second-eye light emitters are activated according to an alternating pattern to alternately illuminate the spatial light modulators with light in the respective first-eye and second-eye spectral bands.

16. The stereoscopic digital projection system of claim 1 wherein the image forming system includes six spatial light modulators, each one being used to modulate light from a respective one of the red, green and blue first-eye and second-eye light emitters.

17. The stereoscopic digital projection system of claim 1 wherein the image forming system includes a first spatial light modulator for modulating light from the red, green and blue first-eye light emitters, and a second spatial light modulator for modulating light from the red, green and blue second-eye light emitters.

18. The stereoscopic digital projection system of claim 1 further including a beam combiner for combining light from a plurality of the spectral bands onto a common optical axis for projection using a common projection lens system.

19. A stereoscopic digital display system that displays stereoscopic images including first-eye images and second-eye images on a display surface, comprising:
narrow-band, solid-state, red, green and blue first-eye light emitters having corresponding red, green and blue first-eye spectral bands with respective red, green and blue first-eye central wavelengths, $\lambda_{R1}$, $\lambda_{G1}$ and $\lambda_{B1}$;
narrow-band, solid-state, red, green and blue second-eye light emitters having corresponding red, green and blue second-eye spectral bands with respective red, green and blue second-eye central wavelengths, $\lambda_{R2}$, $\lambda_{G2}$ and $\lambda_{B2}$, the first-eye spectral bands being substantially non-overlapping with the second-eye spectral bands, and the central wavelengths being arranged such that $\lambda_{B1} < \lambda_{B2} < \lambda_{G2} < \lambda_{G1} < \lambda_{R1} < \lambda_{R2}$; and
an image display system for forming a displayed first-eye image on the display surface using modulated light from the red, green and blue first-eye light emitters responsive to image data for a first-eye image and for forming a displayed second-eye image on the display surface using modulated light from the red, green and blue second-eye light emitters responsive to image data for a second-eye image.

20. The stereoscopic digital display system of claim 19 wherein the stereoscopic digital display system is a stereoscopic digital projection system.

21. The stereoscopic digital display system of claim 19 wherein the stereoscopic digital display system is a stereoscopic digital soft-copy display system.

* * * * *